(12) United States Patent
Sunayama

(10) Patent No.: US 9,606,917 B2
(45) Date of Patent: Mar. 28, 2017

(54) ARITHMETIC PROCESSING APPARATUS AND METHOD FOR CONTROLLING SAME

(71) Applicant: FUJITSU LIMITED, Kawasaki-shi, Kanagawa (JP)

(72) Inventor: Ryuichi Sunayama, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 14/672,284

(22) Filed: Mar. 30, 2015

(65) Prior Publication Data
US 2015/0309934 A1    Oct. 29, 2015

(30) Foreign Application Priority Data

Apr. 25, 2014    (JP) .................................. 2014-090960

(51) Int. Cl.
| | |
|---|---|
| G06F 12/00 | (2006.01) |
| G06F 13/00 | (2006.01) |
| G06F 13/28 | (2006.01) |
| G06F 12/06 | (2006.01) |
| G06F 12/0811 | (2016.01) |
| G06F 12/0817 | (2016.01) |

(52) U.S. Cl.
CPC ...... *G06F 12/0607* (2013.01); *G06F 12/0811* (2013.01); *G06F 12/0826* (2013.01); *G06F 2212/1024* (2013.01); *G06F 2212/1028* (2013.01); *Y02B 60/1225* (2013.01)

(58) Field of Classification Search
CPC ............. G06F 12/0607; G06F 12/0811; G06F 12/0826; G06F 2212/1024; G06F 2212/1028

USPC ......................................... 711/119
See application file for complete search history.

(56) References Cited

U.S. PATENT DOCUMENTS

| | | | | |
|---|---|---|---|---|
| 5,901,281 | A * | 5/1999 | Miyao | G06F 11/1064 714/11 |
| 6,192,451 | B1 * | 2/2001 | Arimilli | G06F 12/0831 711/122 |
| 7,225,300 | B1 * | 5/2007 | Choquette | G06F 12/0831 711/119 |
| 8,145,870 | B2 * | 3/2012 | Dunshea | G06F 12/0864 711/128 |

(Continued)

FOREIGN PATENT DOCUMENTS

| | | |
|---|---|---|
| JP | 2008-525902 A | 7/2008 |
| WO | 2006/072061 A2 | 7/2006 |

*Primary Examiner* — Sheng-Jen Tsai
(74) *Attorney, Agent, or Firm* — Fujitsu Patent Center

(57) ABSTRACT

An arithmetic processing apparatus includes: first and second core groups each including cores, a first to an Nth (N is plural) caches that process access requests from the cores, and an intra-core-group bus through which the access requests from the cores are provided to the first to Nth caches; and a first to an Nth inter-core-group buses each provided between the first to Nth caches in the first and second core groups respectively. The first to Nth caches in the first core group individually store data from a first to an Nth memory spaces in a memory, respectively. The first to Nth caches in the second core group individually store data from an N+1th to a 2Nth memory spaces, respectively. The first to Nth caches in the first core group access the data in the N+1th to 2Nth memory spaces, respectively, via the first to Nth inter-core-group buses.

14 Claims, 13 Drawing Sheets

(56) References Cited

U.S. PATENT DOCUMENTS

| | | | |
|---|---|---|---|
| 2002/0046324 A1* | 4/2002 | Barroso | G06F 12/0826 |
| | | | 711/122 |
| 2006/0143384 A1* | 6/2006 | Hughes | G06F 12/0833 |
| | | | 711/130 |
| 2008/0016284 A1* | 1/2008 | Goodman | G06F 12/0833 |
| | | | 711/141 |
| 2009/0132760 A1* | 5/2009 | Flynn | G06F 1/183 |
| | | | 711/113 |
| 2011/0197028 A1* | 8/2011 | Nikara | G06F 12/084 |
| | | | 711/118 |
| 2013/0290967 A1* | 10/2013 | Calciu | G06F 9/526 |
| | | | 718/102 |

* cited by examiner

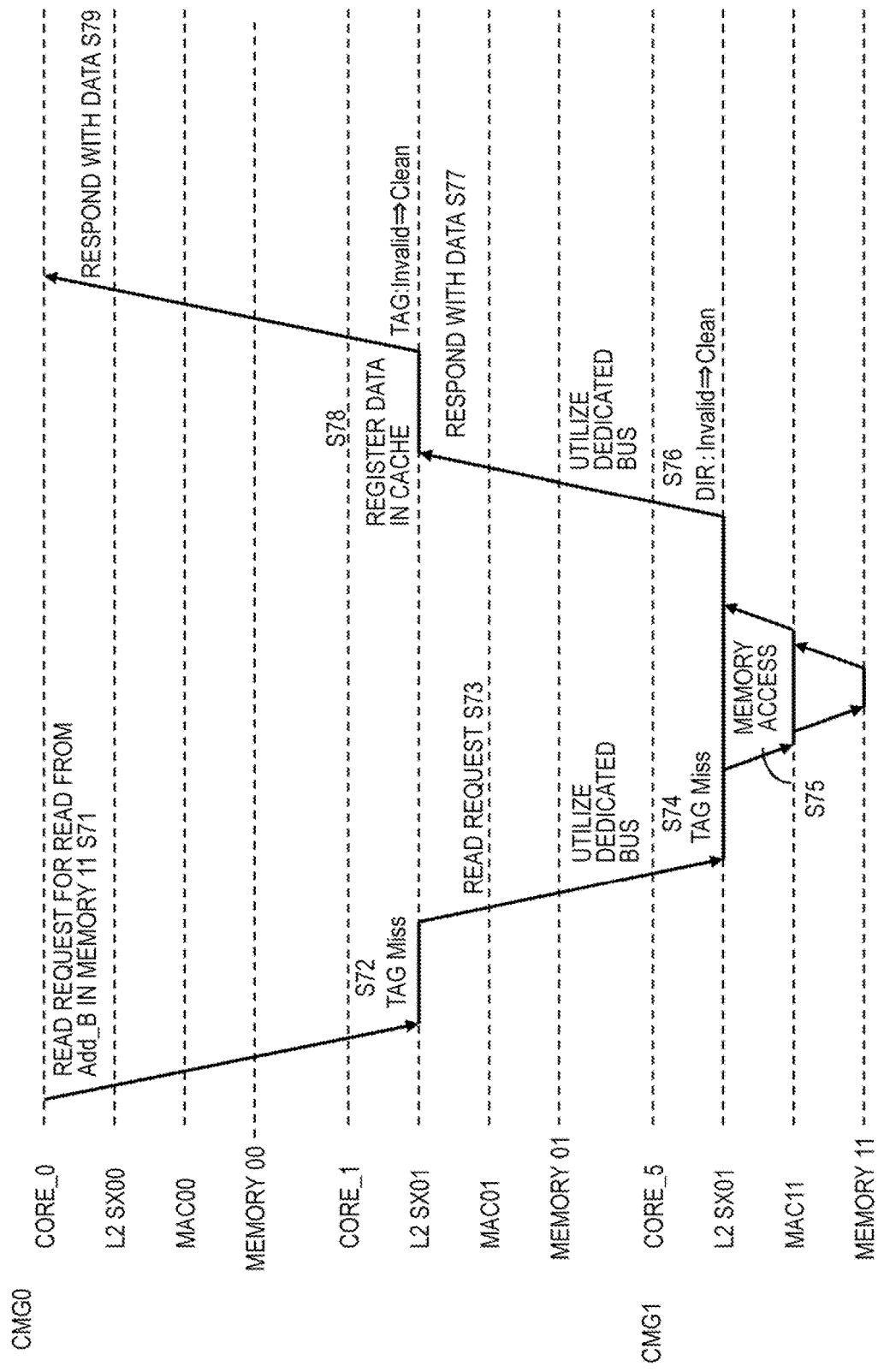

ARITHMETIC PROCESSING APPARATUS AND METHOD FOR CONTROLLING SAME

CROSS-REFERENCE TO RELATED APPLICATION

This application is based upon and claims the benefit of priority of the prior Japanese Patent Application No. 2014-090960, filed on Apr. 25, 2014, the entire contents of which are incorporated herein by reference.

FIELD

The present invention relates to an arithmetic processing apparatus and a method for controlling the arithmetic processing apparatus.

BACKGROUND

A CPU (or a processor) that is an arithmetic processing apparatus has a plurality of CPU cores, primary cache memories (hereinafter referred to as "L1 caches") provided inside the CPU cores, and secondary cache memories (hereinafter referred to as "L2 caches") provided outside the CPU cores and shared by the plurality of CPU cores. Moreover, a CPU chip has memory access controllers that control access requests for access to a large-capacity main memory.

The number of CPU cores in the CPU is increased in order to improve the performance of the CPU. Progress of semiconductor miniaturization techniques enables an increase in the number of CPU cores, whereas the memory capacity of the L2 caches also needs to be increased in order to improve performance.

When the number of CPU cores or the cache capacity is increased in accordance with the miniaturization rate of semiconductors, latency depending on the distance between the CPU core and the caches is not significantly increased. However, when the number of CPU cores or the cache capacity is increased beyond the miniaturization rate of semiconductors in order to improve performance, the distance between the CPU core and the caches relatively increases, prolonging and deteriorating the latency between the CPU core and the cache. This also applies to the latency between the CPU core and the main memory. Thus, an increased number of CPU cores unexpectedly results in cache or memory latency bottleneck, hindering the performance of the CPU from being improved.

An arithmetic processing device is disclosed in JP2008-525902.

As means for preventing cache or memory latency from being deteriorated as a result of the use of multicore, additional provision of one layer of caches to the CPU cores between the L1 caches and the L2 caches has been proposed. An object of the addition is to reduce a cache miss rate in the CPU cores as much as possible by adding one layer of caches. However, an increased number of cache layers mean an increase in the number of cache pipelines, thus deteriorating the latency between the main memory and the CPU cores.

SUMMARY

A One aspect of the embodiment is an arithmetic processing apparatus comprising:

a first core group and a second core group each including a plurality of arithmetic processing sections, a first to an Nth (N is a positive integer) caches that process access requests from the plurality of arithmetic processing sections, and an intra-core-group bus through which the access requests from the plurality of arithmetic processing sections are provided to the first to Nth caches; and a first to an Nth inter-core-group buses each provided between a corresponding one of the first to Nth caches in the first core group and a corresponding one of the first to Nth caches in the second core group, wherein the N is a plural number, the first to Nth caches in the first core group individually store data from a first to an Nth memory spaces in a memory, respectively, the first to Nth caches in the second core group individually store data from an N+1th to a 2Nth memory spaces in the memory, respectively, the first to Nth caches in the first core group access the data in the N+1th to 2Nth memory spaces in the memory, respectively, via the first to Nth inter-core-group buses and store the data, and the first to Nth caches in the second core group access the data in the first to Nth memory spaces in the memory, respectively, via the first to Nth inter-core-group buses and store the data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a sequence diagram depicting the operation for the access request VII.

DESCRIPTION OF EMBODIMENTS

Figure 1:
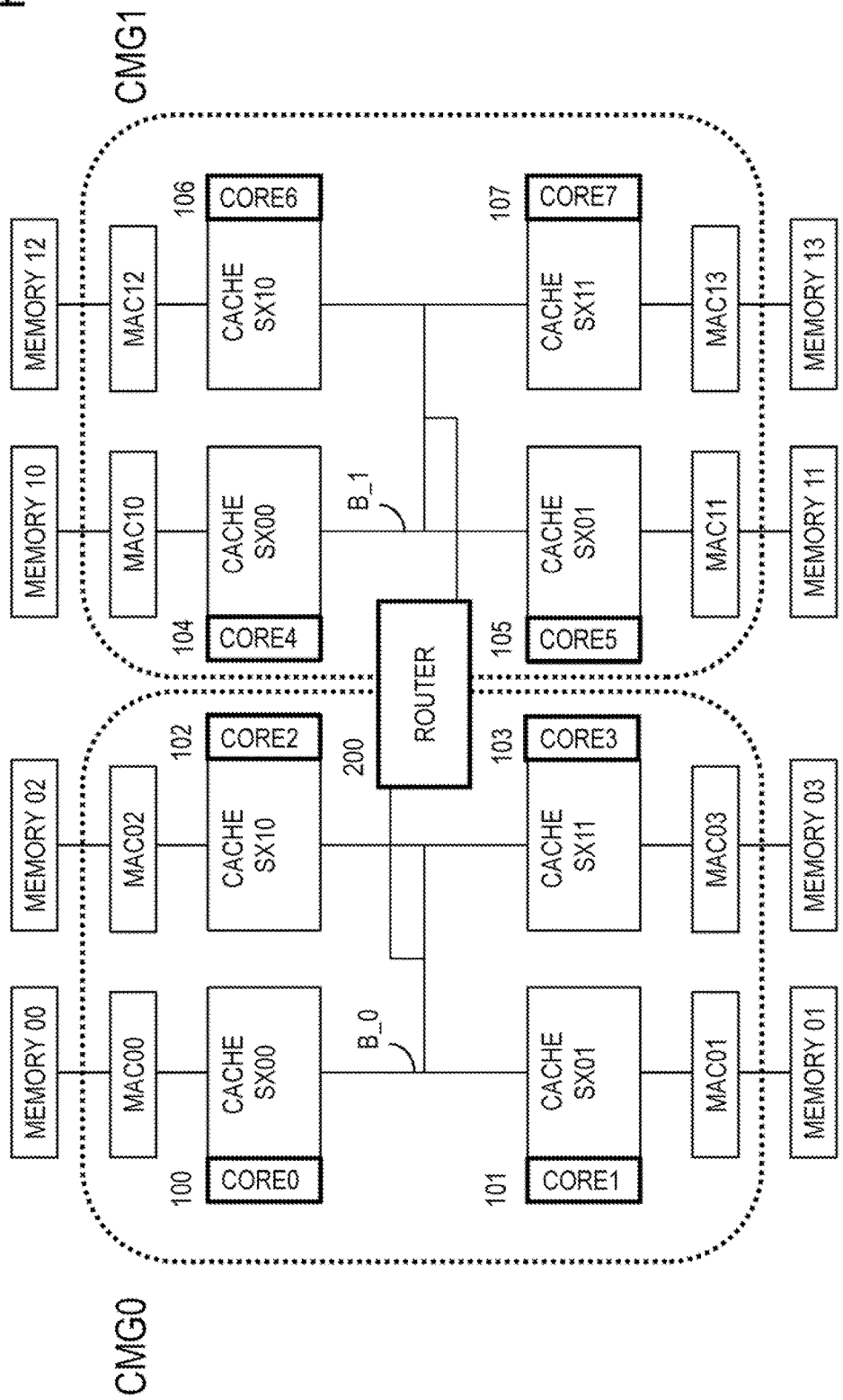
FIG. 1 is a diagram depicting a configuration of an arithmetic processing apparatus with a combination of a plurality of CPU chips.

FIG. 1 is a diagram depicting a configuration of an arithmetic processing apparatus with a combination of two CPU chips. The arithmetic processing apparatus (or a processor) in FIG. 1 has eight arithmetic processing sections or CPU cores (hereinafter referred to as cores) 100 to 107, eight secondary caches (hereinafter referred to as "L2 caches") SX00 to SX11 (in CMG0) and SX00 to SX11 (in CMG0), and eight memory access controllers MAC00 to MAC03 and MAC10 to MAC13. Moreover, in the arithmetic processing apparatus in FIG. 1, a main memory includes eight memories 00 to 03 and 10 to 13, and the memories 00 to 03 and 10 to 13 are accessed via the memory access controllers MAC00 to MAC03 and MAC10 to MAC13, respectively.

Memory spaces in the main memory including the eight memories 00 to 03 and 10 to 13 appear to be a single memory space as viewed from a single operating system (OS). The memory space appears to be flat as viewed from the OS. Data in the memories 00 to 03 and 10 to 13 configuring the main memory can be registered in any of the eight L2 caches. The eight cores 100 to 107 can access any of the L2 caches. However, when the cores 100 to 107 and the L2 caches SX00 to SX11 are laid out as depicted in FIG. 1, for example, a cache line of data accessed and read by the core 100 is desirably registered in the L2 cache SX00 proximate to the core 100.

The arithmetic processing apparatus in FIG. 1 has logical groups CMG0 and CMG1 each having cores, L2 caches, and memory access controllers. The logical groups CMG0 and CMG1 are formed of different CPU chips. The logical group is hereinafter referred to as a core memory group or a core group CMG. The core memory group or core group is a circuit block with at least a plurality of cores and a plurality of cache memories. The memory access controller MAC may be provided outside the CPU chip.

In the core group CMG0, four cores 100 to 103 issue read or write access requests to the four L2 caches SX00 to SX11 via a first bus B_0. Similarly, in the core group CMG1, four cores 104 to 107 issue read or write access requests to the four L2 caches SX00 to SX11 via a first bus B_1.

A router 200 is provided between the two core groups CMG0 and CMG1 to arbitrate access requests between the core groups. The provision of the router 200, for example, allows the core 100 in the CMG0 to issue an access request to data at an address 8 in the memory 11. Moreover, since the router 200 is provided, for example, when the core 100 in the CMG0 issues an access request for access to data at an address A in the memory 01, the data is registered in the L2 cache SX01 in the CMG1, and whether the data has been updated can be inquired via the router 200.

Operations of the arithmetic processing apparatus with configuration in FIG. 1 will be described in brief. It is assumed that the core 100 in the CMG0 issues a read request for the address A in the memory 01 to the L2 cache.

First, upon receiving the read request, when the data in the read request is not registered in the cache SX01, the L2 cache SX01 in the CMG0 inquires of the router 200 whether or not updated data is present in the L2 cache in the CMG1. The router 200 holds tag information on each of the L2 caches in the CMG1 and searches the tag information to check whether the updated data is present in the L2 cache in the CMG1.

When the data is not registered in either of the L2 caches SX01 in the CMG0 and CMG1, the L2 cache SX01 in the CMG0 issues a memory access request for access to the memory 01 to the memory access controller MAC01 to acquire the data at the address A in the memory 01 and responds to the core 100 with the data.

Second, when the data is registered in the L2 cache SX01 in the CMG0 but is not the latest, the L2 cache SX01 in the CMG0 inevitably inquires of the router 200 whether updated data is present in the L2 caches in the CMG1. In this case, when the updated data (that is, the latest data) is registered in the L2 caches in the CMG1, the L2 cache SX01 in the CMG0 makes a data request to the L2 cache in the CMG1 via the router 200, acquires the updated data, and responds to the core 100 with the data.

When the result of the inquiry to the router indicates that the updated data (latest data) is not registered in the L2 caches in the CMG1, the L2 cache SX01 in the CMG0 responds to the core 100 with the registered data in SX01.

Moreover, in the arithmetic processing apparatus in FIG. 1, when the core 100 in the CMG0 issues a read request for the address B in the memory 11, the read request is issued to the L2 cache SX01 in the CMG1 via the router 200, and a response with the data is performed via the router 200.

As described above, in the configuration in which the two CMG0 and CMG1 are simply connected together via the router 200, when the core 100 in the CMG0 issues an access request to any of the L2 caches in the CMG1 and the memory for the L2 cache in CMG1, the access request is issued via the router 200. Thus, the latency between the core and the L2 cache and the latency between the core and the memory are prolonged. Moreover, when the core 100 in the CMG0 issues an access request to any of the L2 caches in the CMG0 and the memory for the L2 cache in CMG0, whether or not the data has been moved out to the corresponding L2 cache in the CMG1 and updated needs to be inquired of the router 200. This prolongs the latencies.

Given that the two core groups CMG0 and CMG1 In FIG. 1 are provided in one CPU chip, the number of cores and the capacity of the L2 caches increase but the provision of the router 200 between the CMG0 and the CMG1 prolongs the latencies.

[Present Embodiment]

Figure 2:
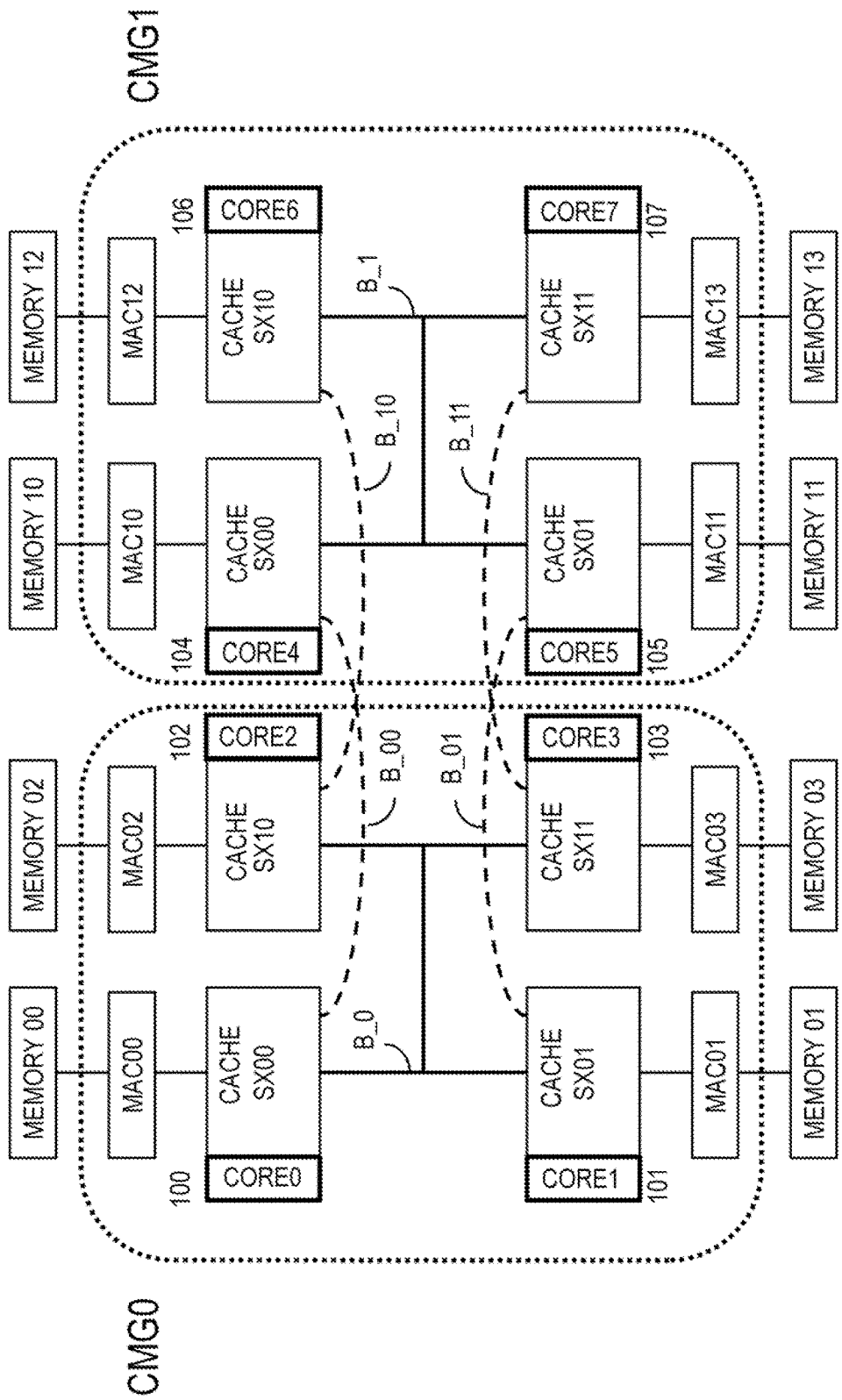
FIG. 2 is a diagram depicting a configuration of an arithmetic processing apparatus according to the present embodiment.

FIG. 2 is a diagram depicting a configuration of an arithmetic processing apparatus according to the present embodiment. In the present embodiment, one CPU chip has a plurality of, for example, two core memory groups or core groups CMG0 and CMG1. The main memory provided outside the CPU chip includes the eight memories 00 to 03 and 10 to 13. The eight memories 00 to 03 and 10 to 13 store data from a first to an eighth memory spaces in the main memory, respectively. However, the present embodiment is not limited to this configuration.

The first core group CMG0 has the cores 100 to 103 that are four arithmetic processing sections and the first to fourth L2 caches SX00 to SX11. The first core group CMG0 further has the memory access controllers MAC00 to MAC03 corresponding to the first to fourth L2 caches SX00 to SX11, respectively. The memory access controllers MAC00 to MAC03 control memory access to the first to fourth memories 00 to 03 with the first to fourth memory spaces in the main memory, respectively.

The first core group CMG0 further has an intra-core-group bus B_0 that provides access requests from the four cores 100 to 103 to the first to fourth L2 caches SX00 to SX11. Each of the first to fourth L2 caches SX00 to SX11 processes access requests issued by the four cores 100 to 103 via the intra-core-group bus B_0. For example, the L2 cache SX00 in the CMG0 processes access requests issued by the four cores 100 to 103 via the intra-core-group bus B_0. This also applies to the other L2 caches SX01 to SX11.

The second core group CMG1 similarly has the cores 104 to 107 that 23 are four arithmetic processing sections and the first to fourth L2 caches SX00 to SX11. The second core group CMG1 further has the memory access controllers MAC10 to MAC13 corresponding to the first to fourth L2 caches SX00 to SX11, respectively. The memory access controllers MAC10 to MAC13 control memory access to the fifth to eighth memories 10 to 13 with the fifth to eighth memory spaces in the main memory, respectively.

The second core group CMG1 further has an intra-core-group bus B_1 that provides access requests from the four cores 104 to 107 to the first to fourth L2 caches SX00 to SX11. Each of the first to fourth L2 caches SX00 to SX11 processes access requests issued by the four cores 104 to 107 via the intra-core-group bus B_1. For example, the L2 cache SX00 in the CMG1 processes access requests issued by the four cores 104 to 107 via the intra-core-group bus B_1. This also applies to the other L2 caches SX01 to SX11.

The arithmetic processing apparatus in FIG. 2 has a first to a fourth inter-core-group buses B_00, B_01, B_10, and B_11 each between a corresponding one of the first to fourth caches SX00 to SX11 in the first core group CMG0 and a corresponding one of the first to fourth caches SX00 to SX11 in the second core group CMG1. That is, the first inter-core-group bus B_00 is provided between the first caches SX00 in the first and second core groups. Similarly, the second, third, and fourth inter-core-group buses B_01, B_10, and B_11 are provided between the second caches SX01 in the first and second core groups, between the third caches SX10 in the first and second core groups, and between the fourth caches SX11 in the first and second core groups, respectively.

The first to fourth inter-core-group buses B_00, B_01, B_10, and B_11 each have a pair of buses, that is, a bus for a first direction from the first 2o core group to the second core group and a bus for a second direction from the second core group to the first core group.

[Relation Between the Memory Spaces and the L2 Caches]

Figure 3:
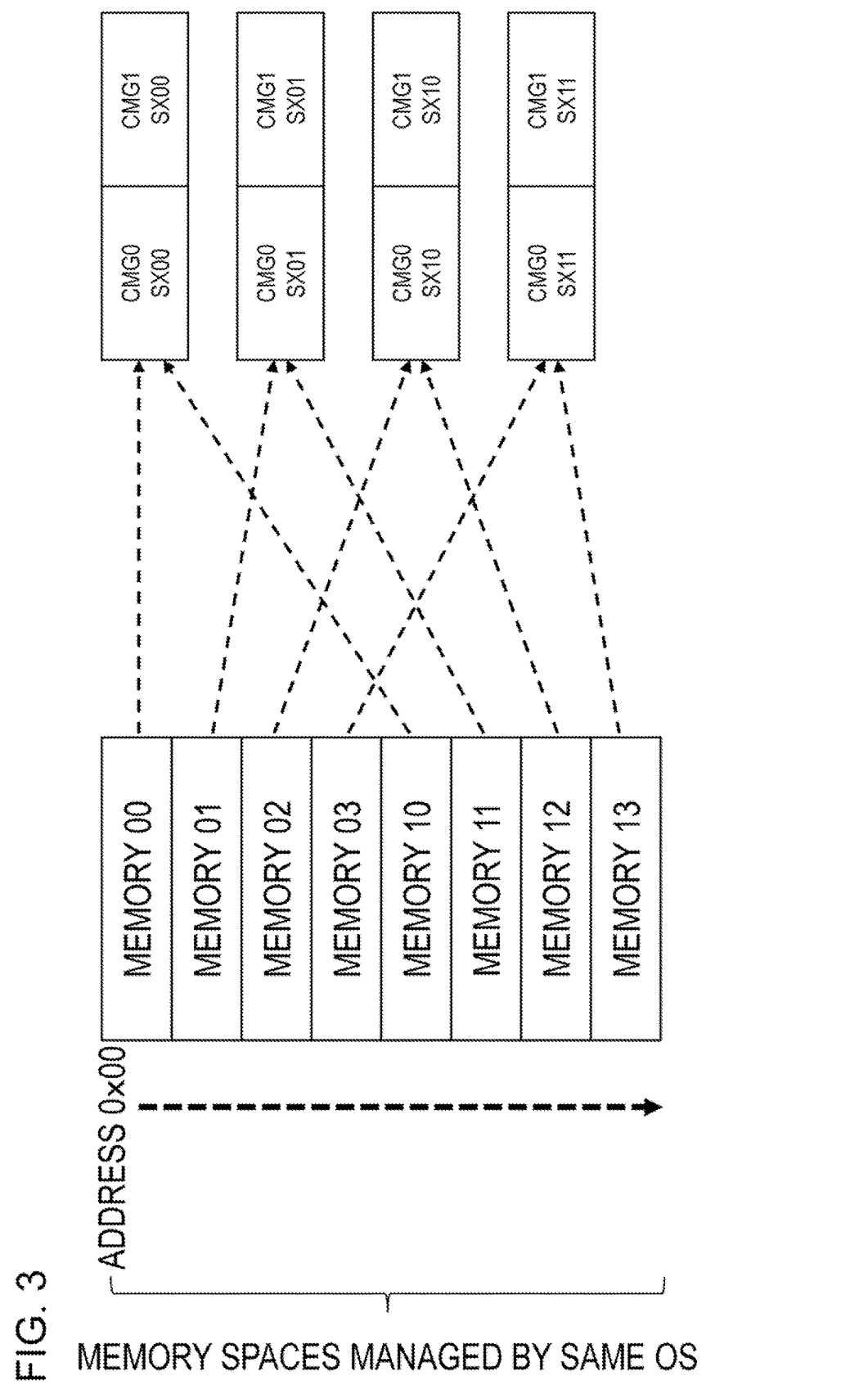
FIG. 3 is a diagram depicting an example of the relation between the L2 caches in the first and second core groups and the memory spaces in the main memory.

FIG. 3 is a diagram depicting an example of the relation between the L2 caches in the first and second core groups and the memory spaces in the main memory. As depicted in FIG. 3, the first to fourth L2 caches SX00 to SX11 in the first core group CMG0 individually or separately store data from the first to fourth memory spaces in the main memory, that is, the memory spaces in the memories 00 to 03, respectively. Similarly, the first to fourth caches SX00 to SX11 in the second core group CMG1 individually or separately store data from the fifth to eighth memory spaces in the main memory, that is, the memory spaces in the memories 10 to 13, respectively.

The first to fourth caches SX00 to SX11 in the first core group CMG0 access data in the fifth to eighth memory spaces in the main memory, that is, the memory spaces in the memories 10 to 13, via the first to fourth inter-core-group buses B00, B_01, B10, and B_11, respectively, and store the respective acquired data. For example, the first L2 cache SX00 in the CMG0 accesses data in the fifth memory space in the main memory, that is, data in the memory space in the memory 10, via the first inter-core-group bus B_00 and stores the acquired data.

Similarly, the first to fourth caches SX00 to SX11 in the second core group CMG1 access data in the first to fourth memory spaces in the main memory, that is, the memory spaces in the memories 00 to 03, via the first to fourth inter-core-group buses B_00, B_01, B_10, and B_11, respectively, and store the respective acquired data. For example, the first L2 cache SX00 in the CMG1 accesses data in the first memory space in the main memory, that is, data in the memory space in the memory 00, via the first inter-core-group bus B00 and stores the acquired data.

As depicted in FIG. 3, the first to fourth L2 caches SX00 to SX11 in the first core group CMG0 stores data from the memories 00 to 03 in an interleaved manner. Specifically, for each of the addresses in the memories 00 to 03, based on lower 2 bits of the address which identify a cache line, data in the memories 00 to 03 is stored in the four L2 caches SX00 to SX11 in the CMG0 in an interleaved manner. Thus, the data in the memories 00 to 03 is stored in any of the four L2 caches SX00 to SX11 in the CMG0.

In conjunction with this, the four cores 100 to 103 in the first core group CMG0 each issue an access request to one of L2 caches SX00 to SX11 in CMG0 which corresponds to the 2-bit address via the intra-core-group bus B_0. Thus, the four cores 100 to 103 in the first core group CMG0 can access any of the first to fourth memory spaces in the main memory.

For example, when accessing data in the memory spaces in the memory 01, the core 100 issues an access request to the L2 cache SX01 in the CMG0 via an intra-core-group bus B_0. In response to the access request, the L2 cache SX01 in the CMG0 accesses the data in the cache memory in the case of a cache hit and accesses the memory 01 in the case of a cache miss. However, as described below, when the L2 cache SX01 in the second core group CMG1 corresponding to the L2 cache SX01 in the CMG0 has taken data out from the memory 01 and updated the data, the L2 cache SX01 in the CMG0 issues an access request to the L2 cache SX01 in the CMG1 to acquire the updated data via the inter-core-group bus B_01.

As described above, the first to fourth L2 caches SX00 to SX11 in the second core group CMG1 store the data in the memories 10 to 13 in an interleaved manner. Thus, the data in the memories 10 to 13 is stored in any of the four L2 caches SX00 to SX11 in the CMG1. In conjunction with this, the four cores 104 to 107 in the second core group CMG1 each issue an access request to one of L2 caches SX00 to SX11 which corresponds to the 2-bit address that controls interleaving, via the intra-core-group bus B_1. Thus, the four cores 104 to 107 in the second core group CMG1 can each access any of the fifth to eighth memory spaces in the main memory.

For example, when accessing data in the memory space in the memory 11, the core 104 issues an access request to the L2 cache SX01 in the CMG1 via the intra-core-group bus B_1. In that case, the L2 cache SX01 processes the access request as described above.

As depicted in FIG. 3, by way of example, the first L2 cache SX00 in the first core group CMG0 stores the data from the memory space in the memory 00, and the second L2 cache SX01 stores the data from the memory space in the memory 01. The third L2 cache SX10 stores the data from the memory space in the memory 10, and the fourth L2 cache SX11 stores the data from the memory space in the memory 11.

In the above-described example, data is also stored in the four memories 00 to 03 based on the above-described 2-bit address in an interleaved manner.

However, since the four cores 100 to 103 are required only to be able to issue access requests to the four L2 caches SX00 to SX11 and access data in the memories 00 to 03, the correspondence relation depicted in FIG. 3 is not always needed.

[Access Request Between the Core Groups]

The present embodiment will further be described with reference back to FIG. 2. Since the four inter-core-group buses B_00, B_01, B_10, and B_11 are provided, the four cores 100 to 103 in the first core group CMG0 can access data in the memory spaces in the memories 10 to 13 via the four L2 caches SX00 to SX11 in the second core group CMG1. For example, when making an access request for access to the address B in the memory 11, the core 100 in the first core group CMG0 first issues an access request to the L2 cache SX01 in the CMG0. A cache miss occurs in the L2 cache SX01 in the CMG0, which then issues an access request to the L2 cache SX01 in the CMG1 via the inter-core-group bus B_01. The L2 cache SX01 in the CMG1 processes the access request, and for example, responds to the L2 cache SX01 in the CMG0 with read data via the inter-core-group bus B_01. The L2 cache SX01 in the CMG0 registers the read data therein, and responds to the core 100 with the data.

In contrast, since the four inter-core-group buses B_00, B_01, B_10, and B_11 are provided, the four cores 104 to 107 in the second core group CMG1 can also access data in the memory spaces in the memories 00 to 03 via the four L2 caches SX00 to SX11 in the first core group CMG0.

As described above, the arithmetic processing apparatus according to the present embodiment does not have a router between the core groups as depicted in FIG. 1 or have inter-core-group buses between each pair of the eight L2 caches. The arithmetic processing apparatus according to the present embodiment has inter-core-group buses B_00, B_01, B_10, and B_11 between the first L2 caches SX00 in the first and second core groups CMG0 and CMG1, between the second L2 caches SX01 in the first and second core groups CMG0 and CMG1, between the third L2 caches SX10 in the first and second core groups CMG0 and CMG1, and between the fourth L2 caches SX11 in the first and second core groups CMG0 and CMG1. In other words, the four inter-core-group buses are only a limited number of buses.

In the arithmetic processing apparatus according to the present embodiment, the four L2 caches SX00 to SX11 in the first core group CMG0 store the data from the memories 00 to 03, respectively, in an interleaved manner. The four L2 caches SX00 to SX11 in the second core group CMG1 store the data from the memories 10 to 13, respectively, in an interleaved manner. Thus, the four cores 100 to 103 in the first core group CMG0 can access the four L2 caches SX00 to SX11 and the four memories 00 to 03 which are proximate to the first cores 100 to 103 in the first core group CMG0 with short latencies. Similarly, the four cores 104 to 107 in the second core group CMG1 can access the four L2 caches SX00 to SX11 and the four memories 10 to 13 which are proximate to the first cores 104 to 107 in the second core group CMG1 with short latencies.

Furthermore, since data is stored in the four L2 caches SX00 to SX11 in an interleaved manner, when a chunk of data in consecutive address areas within a predetermined range is accessed, data requests can be issued to the four L2 caches in parallel and processed in parallel, enabling a reduction in latencies. Moreover, if data also are stored in the memories 00 to 03 and 10 to 13 in an interleaved manner as described above, memory accesses can be processed in parallel.

Additionally, in the arithmetic processing apparatus according to the present embodiment, data is stored in the four L2 caches in an interleaved manner and the four inter-core-group buses B_00, B_01, B_10, and B_11 are provided. Thus, the eight cores 100 to 107 can access data in all of the memory spaces in the eight memories 00 to 03 and 10 to 13. Therefore, although the number of the inter-core-group buses is limited, the eight cores 100 to 107 can access all the memory spaces, allowing all the memory spaces to be effectively utilized.

Desirably, the arithmetic processing apparatus according to the present embodiment performs control in which a plurality of processes in an application program are processed in parallel such that a first process is processed by the cores 100 to 103 in the first core group CMG0 and the resultant data is stored in the memories 00 to 03, while a second process is processed by the cores 104 to 107 in the second core group CMG1 and the resultant data is stored in the memories 10 to 13. Such control allows the cores 100 to 103 in the first core group CMG0 to access the desired data by using access requests for access to the L2 caches in the first core group CMG0, enabling a reduction in the probability of access requests for access to the L2 caches in the second core group CMG1. Similarly, the cores 104 to 107 in the second core group CMG1 can access the desired data by using access requests for access to the L2 caches in the second core group CMG1, enabling a reduction in the probability of access requests for access to the L2 caches in the first core group CMG0. In this case, the usage frequency of the limited number of buses, that is, the four inter-core-group buses B_00, B_01, B_10, and B_11, can be suppressed.

[Details of the Present Embodiment]

Figure 4:
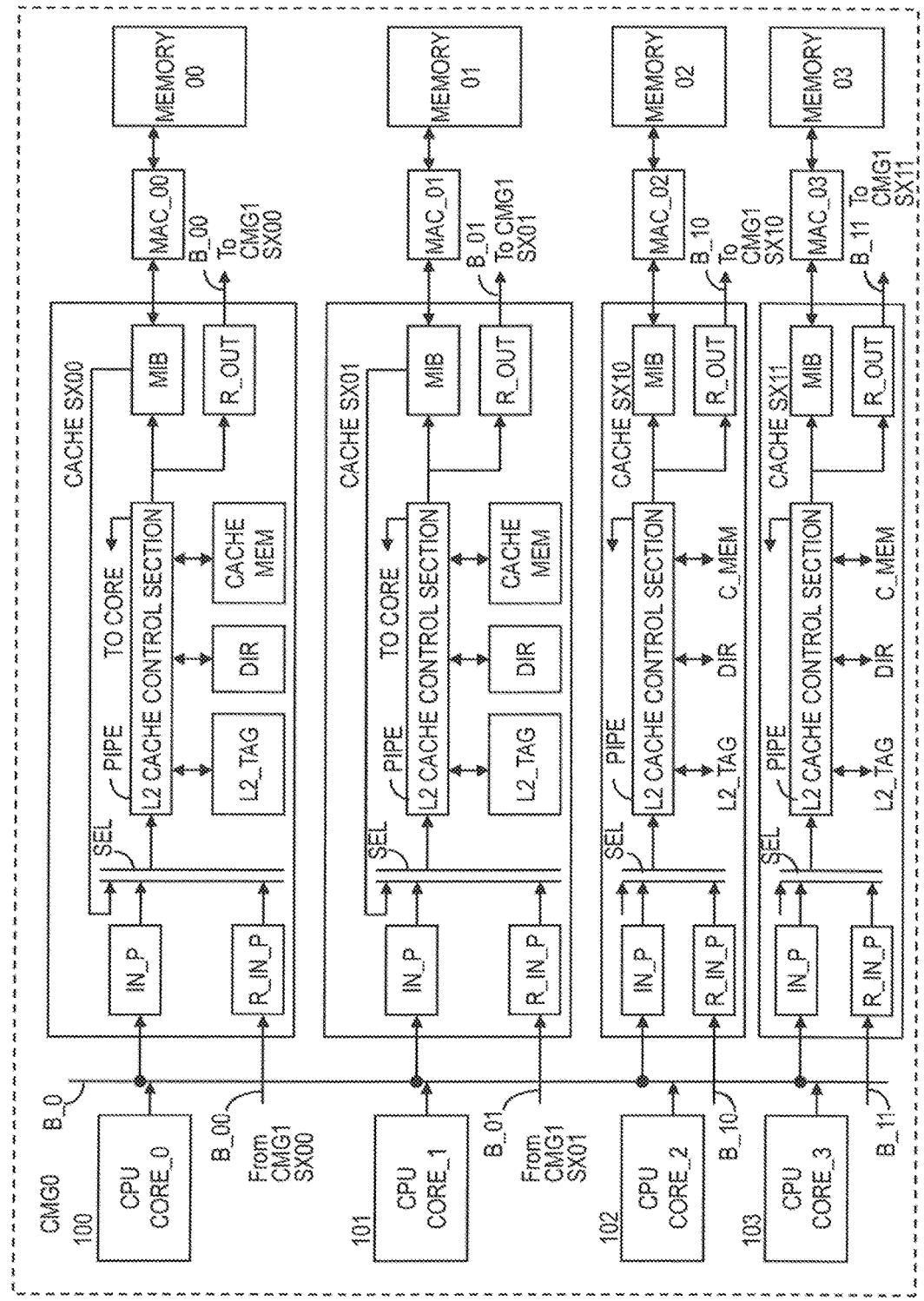
FIG. 4 is a diagram depicting a configuration of the first core group CMG0.

Now, a detailed configuration example of the arithmetic processing apparatus according to the present embodiment will be described. FIG. 4 is a diagram depicting a configuration of the first core group CMG0. As is the case with FIG. 2, the core group CMG0 has the four CPU cores 100 to 103 and the four L2 caches SX00 to SX11.

The first L2 cache SX00 has a request input port IN_P in which access requests issued by the four cores 100 to 103 via the intra-core-group bus 2o B_0 are stored and a remote request input port R_IN_P in which access requests input via the inter-core-group bus B_00 are stored.

The four cores 100 to 103 determines an L2 cache that is an access request target based on an address in the access request, and outputs the access request to the determined L2 cache via the intra-core-group bus B_0. Since the data in the main memory is stored in the four L2 caches SX00 to SX11 in an interleaved manner as described above, the four cores 100 to 103 determines the L2 cache that is the access request target based on the 2-bit address that controls interleaving. Thus, via the L2 caches SX00 to SX11 In CGM0, the four cores 100 to 103 can access any data in the memories 00 to 03 configuring the main memory via the intra-core-group bus 860, and register the data in the cache.

Moreover, the L2 cache SX00 has a request selector SEL that selects a request from the requests stored in the input ports IN_P and R_IN_P and inputs the selected request into an L2 cache control section PIPE, the L2 cache control section PIPE configuring a cache pipeline, a cache tag L2_TAG, a directory DIR, and a cache memory CACHE_MEM. The tag L2_TAG stores address information on the data registered in the cache memory and status information on the data. The directory DIR stores status information on the L2 caches in the CMG1 which has moved out and registered data in the memories in the CMG0.

The directory DIR may not be necessarily provided. However, with the directory DIR provided, when a cache miss occurs in any of the L2 caches in the CMG0, the directory DIR can be referenced to check the status information on the data in the corresponding L2 cache in the CMG1, particularly whether or not the data is updated data (that is, the latest data) different from the corresponding data in the main memory.

Moreover, the L2 cache SX00 has a move-in buffer MIB in which memory access requests from the cache control section PIPE are stored and a remote request output port R_OUT in which access requests for access to the L2 cache SX00 in the second core group CMG1 are stored. The memory access request in the move-in buffer MIB is input to the memory access controller MAC_00, which performs memory access to the memory 00 in the main memory. Then, when the memory access is a read request, read data is returned from the memory access controller MAC_00 to the move-in buffer MIB, input to the cache control section PIPE again via the request selector SEL, and is registered in a cache line in the cache SX00. Furthermore, the cache control section PIPE responds to the requesting core with the data read from the cache memory.

The access request in the remote request output port R_OUT is output to the first L2 cache SX00 in the second core group CMG1 (not depicted in the drawings) via the first inter-core-group bus B_00. In contrast, the access request from the first L2 cache SX00 in the second core group CMG1 is stored in the remote request input port R_IN_P via the first inter-core-group bus B_00 and input to the first L2 cache SX00 in the first core group CMG0. In other words, the first inter-core-group bus B_00 is formed of a pair of buses.

The second, third, and fourth L2 caches SX01 to SX11 are configured similarly to the first L2 cache SX00. However, the second L2 cache SX01 in the CMG0 stores an access request for access to the second L2 cache in the CMG1 (not depicted in the drawings) in the remote request output port R_OUT, and outputs the access request to the second L2 cache in the CMG1 via the second inter-core-group bus B_01. Furthermore, the second L2 cache SX01 in the CMG0 inputs an access request from the second L2 cache in the CMG1 (not depicted in the drawings) to the remote request input port R_IN_P via the second inter-core-group bus B_01. This also applies to the third and fourth L2 caches SX10 and SX11.

The configuration of the second core group CMG1 is equivalent to the configuration of the first core group CMG0.

Figure 5:
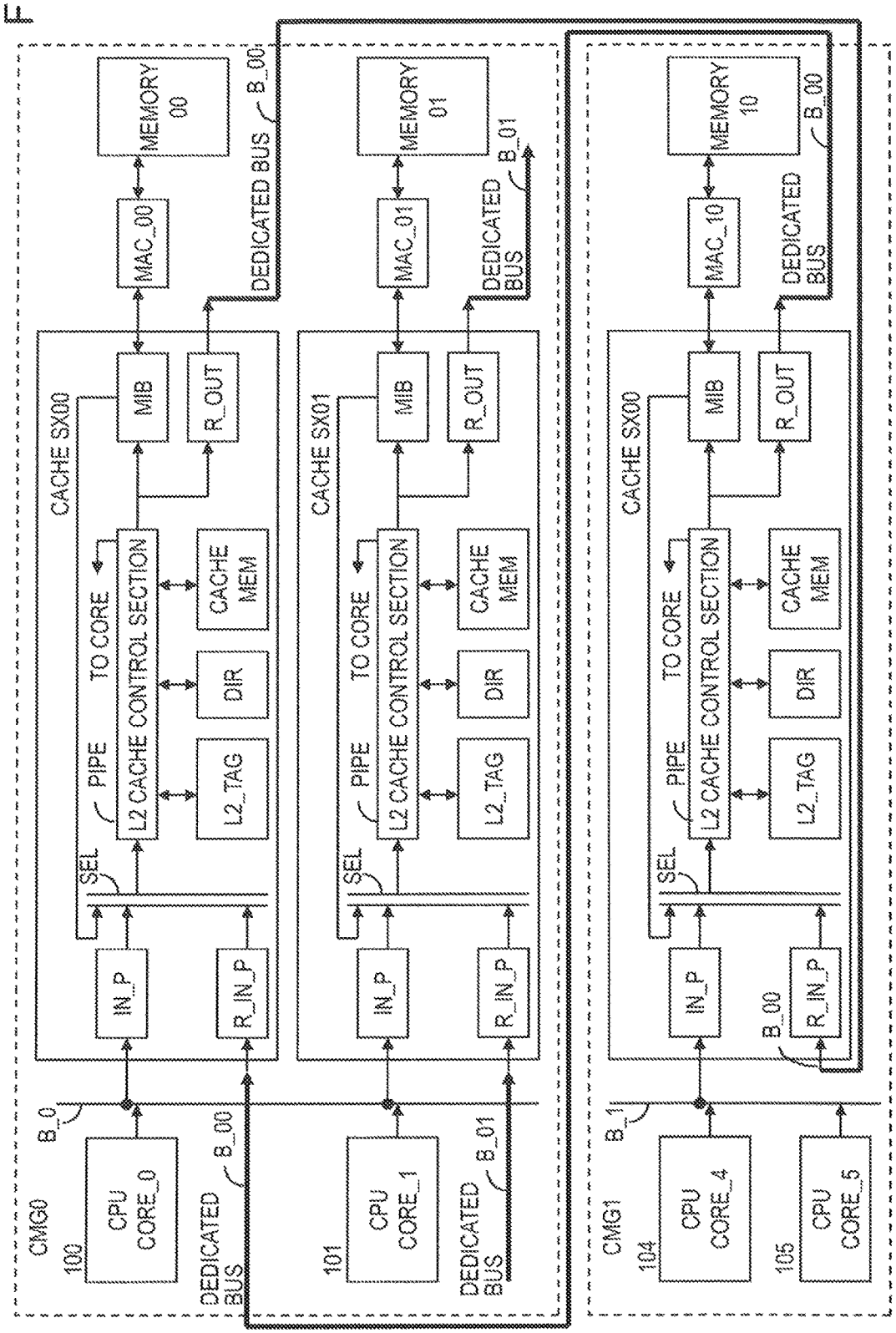
FIG. 5 is a diagram depicting a configuration of the first and second core groups CMG0 and CMG1 and a configuration of the inter-core-group bus between the first and second core groups CMG0 and CMG1.

FIG. 5 is a diagram depicting a configuration of the first and second core groups CMG0 and CMG1 and a configuration of the inter-core-group bus between the first and second core groups CMG0 and CMG1. FIG. 5 depicts the first and second L2 caches SX00 and SX01 in the first core group CMG0 and the first L2 cache SX00 in the second core group CMG1. The configuration of these L2 caches is as described with reference to FIG. 4. The third and fourth L2 caches SX10 and SX11 in the CMG0 (not depicted in the drawings) and the second to fourth L2 caches SX01 to SX11 in the CMG1 (not depicted in the drawings) have similar configurations.

FIG. 5 depicts a specific configuration of the inter-core-group bus B_00. The first inter-core-group bus B_00 is provided between the remote request output port R_OUT of the first L2 cache SX00 in the first core group CMG0 and the remote request input port RN_INP of the first L2 cache SX00 in the second core group CMG1. In contrast, the first inter-core-group bus B_00 for the opposite direction is provided between the remote request output port R_OUT of the first L2 cache SX00 in the second core group CMG1 and the remote request input port R_IN_P of the first L2 cache SX00 in the first core group CMG0. Thus, the first inter-core-group bus B_00 is formed of a pair of buses.

Although not clearly depicted in FIG. 5, the second inter-core-group bus B_01 is provided between the remote request output port R_OUT of the second L2 cache SX01 in the first core group CMG0 and the remote request input port R_IN_P of the second L2 cache SX01 in the second core group CMG1. In contrast, the second inter-core-group bus B_01 for the opposite direction is provided between the remote request output port R_OUT of the second L2 cache SX01 in the second core group CMG1 and the remote request input port R_IN_P of the second L2 cache SX01 in the first core group CMG0. The third and fourth inter-core-group buses B_10 and B_11 have similar configurations.

[Operations for an Access Request in the Present Embodiment]

Operations for an access request in the arithmetic processing apparatus according to the present embodiment will be described in brief. The following description assumes that, for example, the data in the main memory is registered in the memories 00, 01, 02, and 03 configuring the main memory, in an interleaved manner, that the data in the memory 00 is registered in the first L2 cache SX00, and that the data in the memories 01, 02, and 03 is similarly registered in the second, third, and fourth L2 caches SX01, SX10, and SX11, respectively.

In a first operation, when accessing data at an address X in the memory 00, the first core 100 in the first core group CMG0 outputs an access request to the request input port IN_P of the first L2 cache SX00 via the intra-core-group bus B_0. In response to the access request, the first L2 cache SX00 searches the tag L2_TAG to determine whether or not a cache hit has occurred. When a cache hit occurs, the first L2 cache SX00 accesses data in the cache memory CACHE_MEM and responds to the first core 100 with the read data when the access request is a read request. When a cache miss occurs, the first L2 cache SX00 accesses the data at the address X in the memory 00 via the move-in buffer MIB and the memory access controller MAC_00 and responds to the first core 100 with the read data when the access request is a read request.

However, as described with reference to FIG. 3, the first L2 cache SX00 in the second core group CMG1 may move data out from the memory 00 and store the data. Thus, when the data stored in the L2 cache SX00 in the CMG1 is the latest, updated data, the L2 cache SX00 in the CMG0 requests the updated data from the L2 cache SX00 in the CMG1 via the inter-core-group bus B_00 to acquire the updated data via the inter-core-group bus B_00. This operation will be described below in detail.

As described above, the first core 100 in the first core group CMG0 can access data in the memories 00 to 03 configuring the main memory by issuing an access request to the access request target L2 cache determined based on the address of the access target. The second, third, and fourth cores 101 to 103 can similarly access data in the memories 00 to 03 configuring the main memory.

In a second operation, when accessing data at an address Y in the memory 10, the first core 100 in the first core group CMG0 outputs an access request to the request input port IN_P of the first L2 cache SX00 in the CMG0 via the intra-core-group bus B_0. When the first L2 cache SX00 in the CMG0 does not store the data from the memory 10 that is to be accessed, a tag search in the first L2 cache SX00 results in a cache miss. The first L2 cache SX00 then stores the access request to the first L2 cache SX00 in the CMG1 in the remote request output port R_OUT. The access request stored in the remote request output port R_OUT is transferred to the remote request input port R_IN_P of the first L2 cache SX00 in the CMG1 via the inter-core-group bus B_00 and input to the cache control section PIPE of the first L2 cache SX00 in CMG1.

The cache control section PIPE of the first L2 cache SX00 in the CMG1 processes the input access request, and accesses the cache memory CACHE_MEM or the memory 10. For a read request, the cache control section PIPE in SX00 of CMG1 stores read data in the remote request output port R_OUT and inputs the read data to the remote request input port RJN_P of the first L2 cache SX00 in the CMG0 via the inter-core-group bus B_00 for the opposite direction. The cache control section PIPE of the first L2 cache SX00 in the CMG0 registers the read data in the response therein and responds to the requesting core 100 with the data.

For a third operation, it is assumed in the above-described first operation that, when accessing the data at the address X in the memory 00, the first core 100 in the first core group CMG0 outputs an access request to the request input port IN_P of the first L2 cache SX00 via the intra-core-group bus B_0. The first L2 cache SX00 checks whether or not the first L2 cache SX00 in the CMG1 has moved data out from the memory 00 and stored the data regardless of whether a tag search results in a cache miss or a cache hit. The check can be executed by searching the directory DIR or outputting a tag search request to the first L2 cache SX00 in the CMG1 via the inter-core-group bus B_00. The inter-core-group bus B_00 may also be utilized to make such a tag search request.

For a fourth operation, it is assumed in the above-described first operation that, when accessing the data at the address X in the memory 00, the first core 100 in the first core group CMG0 outputs an access request to the request input port IN_P of the first L2 cache SX00 via the intra-core-group bus B_0. The first L2 cache SX00 in CMG0 may perform a tag search, which results in a cache miss, and then acquire data from the memory 00, whereas the first L2 cache SX00 in the CMG1 also stores the same data. In that case, the first L2 cache SX00 in the CMG0 outputs a tag change request to the first L2 cache SX00 in the CMG1 utilizing the first inter-core-group bus B_00, in order to change the status information on the tag in the first L2 cache SX00 in the CMG1. The inter-core-group bus B_00 may also be utilized to make such a tag change request.

[Operations for Seven Access Requests in the Present Embodiment]

Operations for seven access requests in the arithmetic processing apparatus according to the present embodiment will be described.

In the embodiment described below, the cache has five statuses (status information). First, the cache may be in a status (invalid) where the data is not registered in the cache or in a status (valid) where the data is registered in the cache. Second, in the valid status, the cache may be in a status (exclusive non-updated status; clean) where the data in the cache is not shared by other cache and is the same as the data in the main memory, in a status (exclusive updated status; dirty) where only the data in the cache has been updated, leading to inconsistency with the data in the main memory, or in a status (shared status; share) where data at a certain address in the main memory is registered in a plurality of caches. The share status does not ensure that the data in the other caches is clean.

In short, the status of the cache is "invalid", "clean", "dirty", or "share", and the three statuses other than the invalid status are valid even when the statuses are not specified to be valid. The status information is stored in the tag in the cache.

Furthermore, in the embodiment described below, the L2 caches SX00 to SX11 in one of the core groups CMG hold directory information indicating whether or not the L2 caches in the other core group CMG paired with the respective L2 caches SX00 to SX11 in the one of the core groups CMG store data from the memory for the one of the core groups, in other words, whether or not the data has been taken out from the memory. Thus, when searching the cache tag, the L2 caches can determine whether or not the data is stored in the L2 caches in the other core group by searching for the directory information.

The directory information has an invalid status, a clean status, a dirty status, and a share status like the cache status information. In the invalid status, the data is not stored in the L2 caches in the other CMG. In the clean status, the dirty status, and the share status, the data is stored in the L2 caches in the other CMG.

The L2 cache holds the directory information in order to quickly check the status of the data taken out from the L2 caches in the other CMG. Thus, if the L2 cache does not hold the directory information, the L2 cache may search a tag in the L2 caches in the other CMG. Operations performed in that case will be described last.

In the following operation, it is assumed that, when a tag search results in a cache miss, each L2 cache searches the directory DIR. On the other hand, when a tag search results in a cache hit, the directory DIR is not searched. This is intended to reduce power consumed for the directory DIR searching. The directory DIR may be searched regardless of whether a cache miss or a cache hit occurs.

Figure 6:
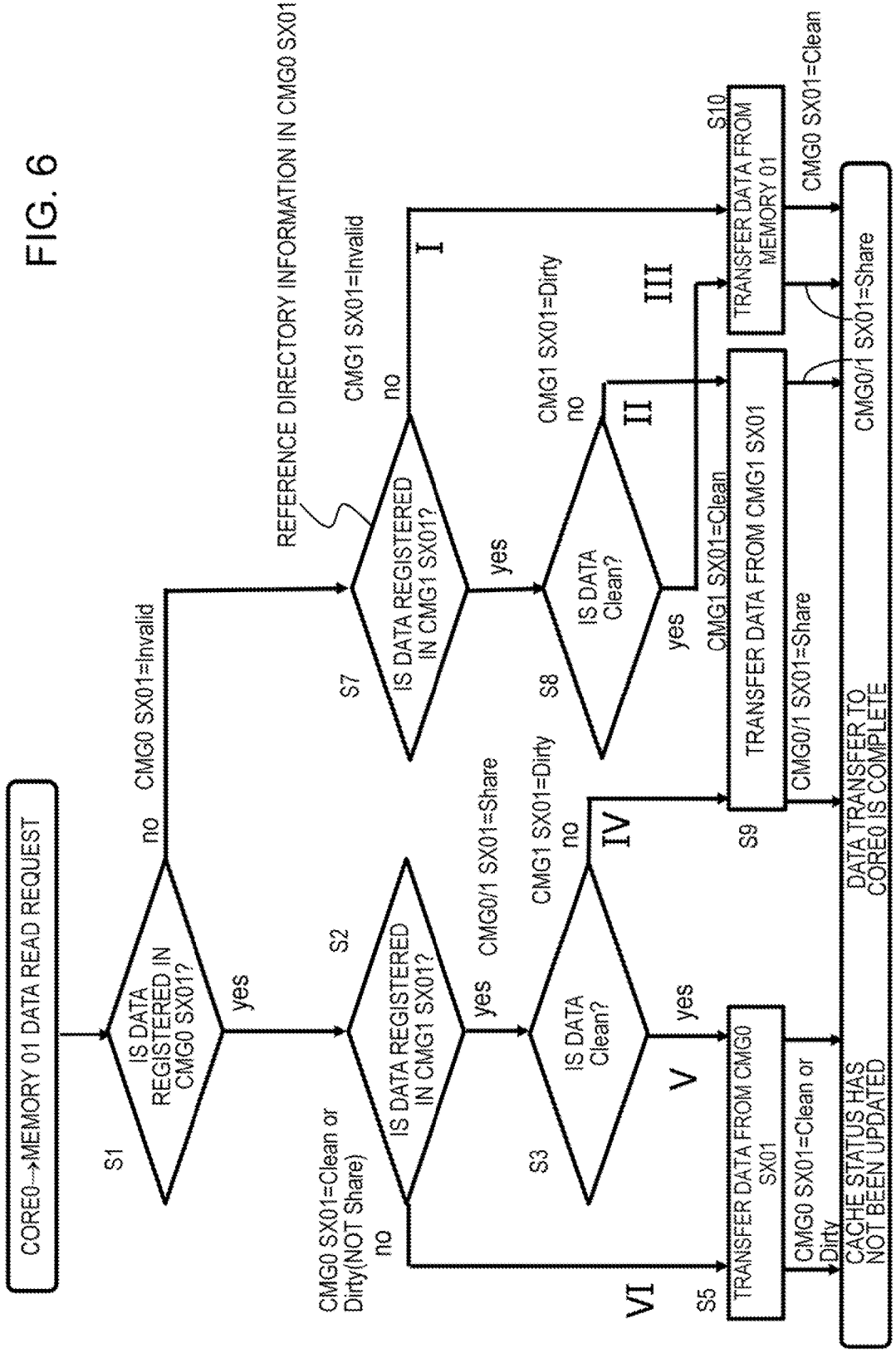
FIG. 6 is a flowchart of operations performed in response to access requests according to the present embodiment.

FIG. 6 is a flowchart of operations performed in response to access requests according to the present embodiment. FIG. 6 depicts operations for six of the seven access requests described below which are performed when the core 100 (CORE_0) in the first core group CMG0 makes an access request for access to the address A in the memory 01, particularly a read request (load request). The operations for the access requests will be described also with reference to a flowchart in FIG. 6.

[Access Request 1]

The operation for an access request I is an operation (S10) in which, in FIG. 6, when the data is not registered in the SX01 in the CMG0 (S1, NO) and in the SX01 in the CMG1 (S7, NO), the data is transferred from the memory 01. Determination in step S7 is performed by referencing the directory information in the L2 cache SX01 in the CMG0.

Figure 7:
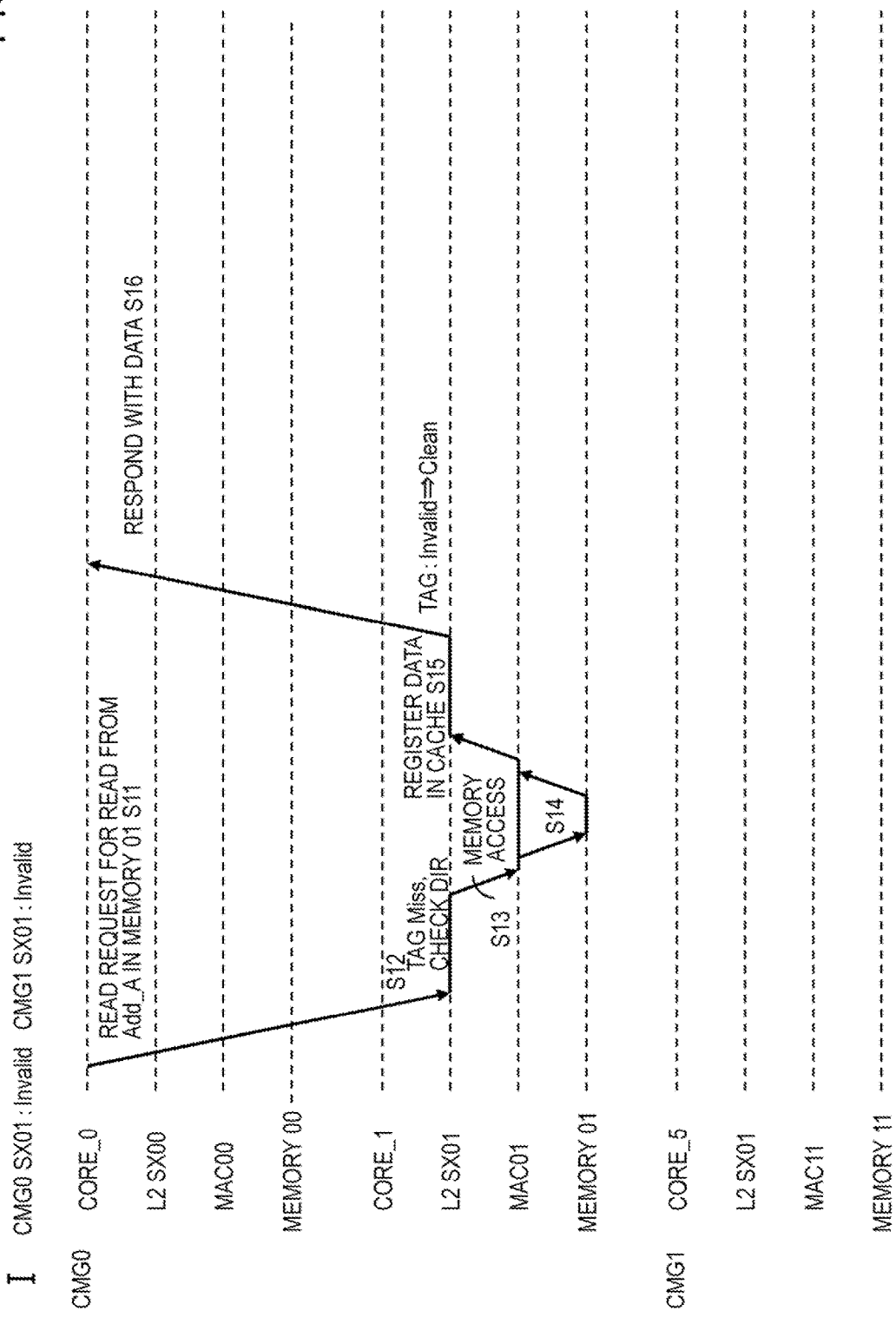
FIG. 7 is a sequence diagram depicting the operation for the access request I.

FIG. 7 is a sequence diagram depicting the operation for the access request I. The assumed status information is such that the L2 cache SX01 in the CMG0 is in the invalid status and that the L2 cache in the CMG1 is also in the Invalid status.

First, the core 100 (CORE_0) in the first core group CMG0 outputs a read request for read from the address A in the memory 01 to the request input port IN_P of the L2 cache SX01 via the intra-core-group bus B_0 (S11). When the read request is input to the L2 cache SX01, L2 cache SX01, in response to the input read request, performs a tag search, which results in cache miss, and then carries out a directory search to detect the invalid status (S12).

Because the data is not stored either in the L2 cache SX01 in the CMG0 or in the L2 cache SX01 in the CMG1, the L2 cache SX01 in the CMG0 makes an access request (read request) to the memory 01 via the memory access controller MAC_01 to read the data at the address A in the memory 01 (S13, S14). When the memory access controller MAC_01 responds with the data, the L2 cache SX01 in the CMG0 registers the data therein and changes the tag status information from the invalid status to the clean status (S15). The L2 cache SX01 in the CMG0 responds to the requesting core 100 (CORE_0) with the data (S16). Registration of the data and the tag in the L2 cache SX01 (S15) is performed by the move-in buffer MIB by inputting a cache registration request to the L2 cache SX01.

[Access Request II]

The operation for an access request II is an operation in which, in FIG. 6, when the data is not registered in the L2 cache SX01 in the CMG0 (S1, NO) but is registered in the L2 cache SX01 in the CMG1 in the dirty status (S7, YES and S8, NO), the data is transferred from the L2 cache SX01 in the CMG1 (S9). Determination in step S7 is performed by referencing the directory information in the L2 cache SX01 in the CMG0.

Figure 8:
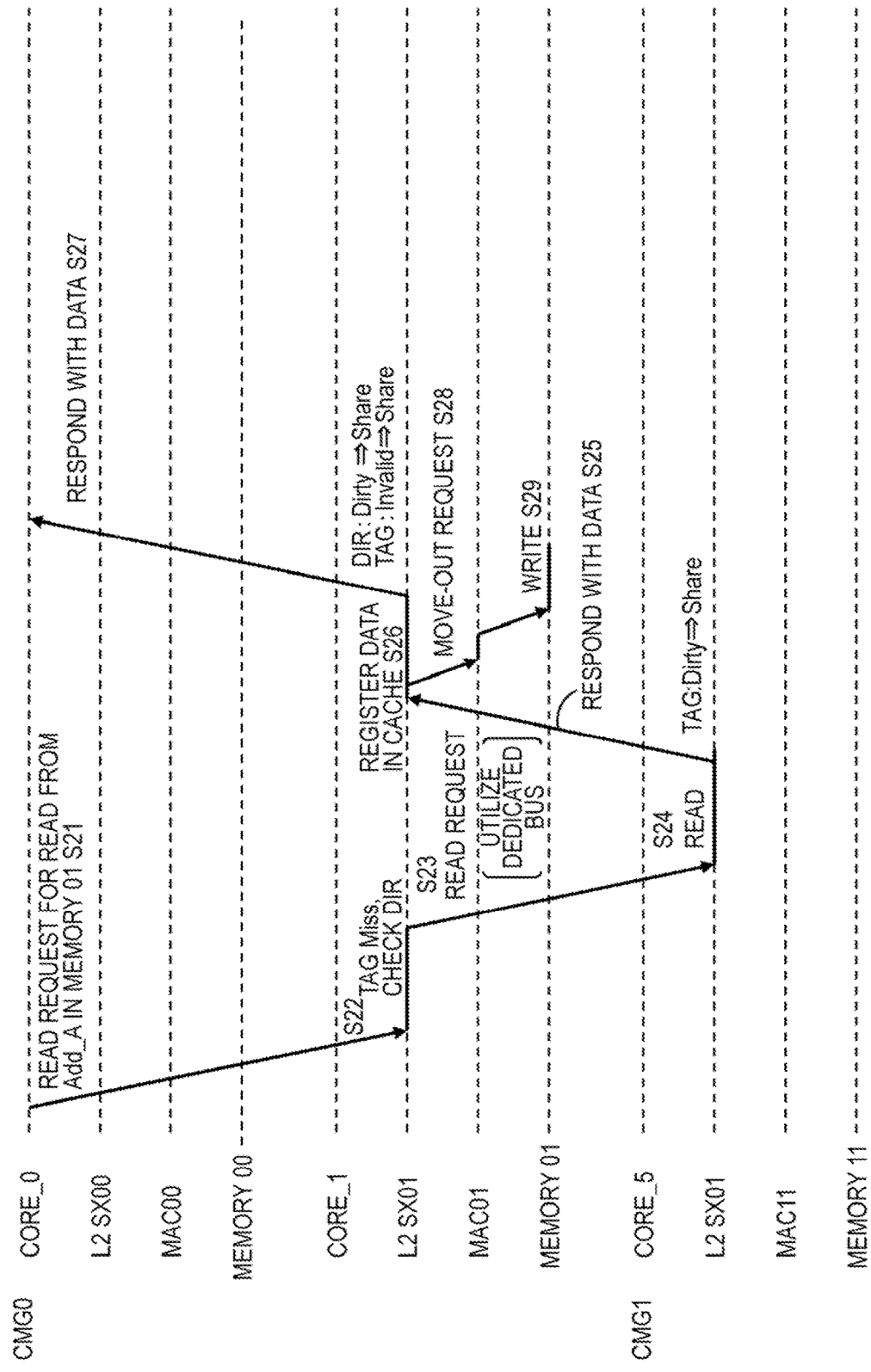
FIG. 8 is a sequence diagram depicting the operation for the access request II.

FIG. 8 is a sequence diagram depicting the operation for the access request II. The assumed status information is such that the L2 cache SX01 in the CMG0 is in the invalid status and the L2 cache SX01 in the CMG1 has been changed from the clean status to the dirty status.

First, the core 100 (CORE_0) in the first core group CMG0 outputs a read request for read from the address A in the memory 01 to the request input port IN_P of the L2 cache SX01 via the intra-core-group bus B_0 (S21). In response to the read request, the L2 cache SX01 in the CMG0 performs a tag search, which results in cache miss, and then carries out a directory search to detect the dirty status (S22).

Then, the L2 cache SX01 in the CMG0 outputs the read request from the remote request output port R_OUT to the remote request input port R_IN_P of the L2 cache SX01 in the other core group CMG1, via the inter-core-group bus B_01 (S23).

The L2 cache SX01 in the CMG1 performs a tag search, which results in a cache hit, then reads the data from the cache memory and change the tag status information from dirty to share (S24). The L2 cache SX01 in the CMG1 then responds to the L2 cache SX01 in the CMG0 with the data via the inter-core-group bus B_01 for the opposite direction (S25). The L2 cache SX01 in the CMG0 registers the data in the cache, and changes the tag status information from "invalid" to "share". The L2 cache SX01 in the CMG0 further changes the directory information from dirty to share (S26), and responds to the requesting core 100 (CORE_0) with the data (S27). At the same time, the L2 cache SX01 in the CMG0 outputs a move-out request to the memory access controller MAC_1 (S28) to allow the data to be written to the memory 01 (S29). Thus, data coherency is maintained between the cache and the memory, and the data in the L2 cache SX01 in the CMG0 is in the clean status. In this example, the tag status information is changed to the share status.

In the operation for the access request II, the L2 cache SX01 in the CMG0 utilizes the inter-core-group bus B_01 to output a read request to the L2 cache SX01 in the CMG1 and receive a data response. This process does not need to involve the pipeline process of the router as depicted in FIG. 1.

[Access Request III]

The operation for an access request III is an operation in which, in FIG. 6, when the data is not registered in the L2 cache SX01 in the CMG0 (S1, NO) but is registered in the L2 cache SX01 in the CMG1 in the clean status (S7, YES and S8, YES), the L2 cache SX01 in the CMG0 reads and transfers the data from the memory 01 (S10). Determination in step S7 Is performed by referencing the directory information in the L2 cache SX01 in the CMG0.

Figure 9:
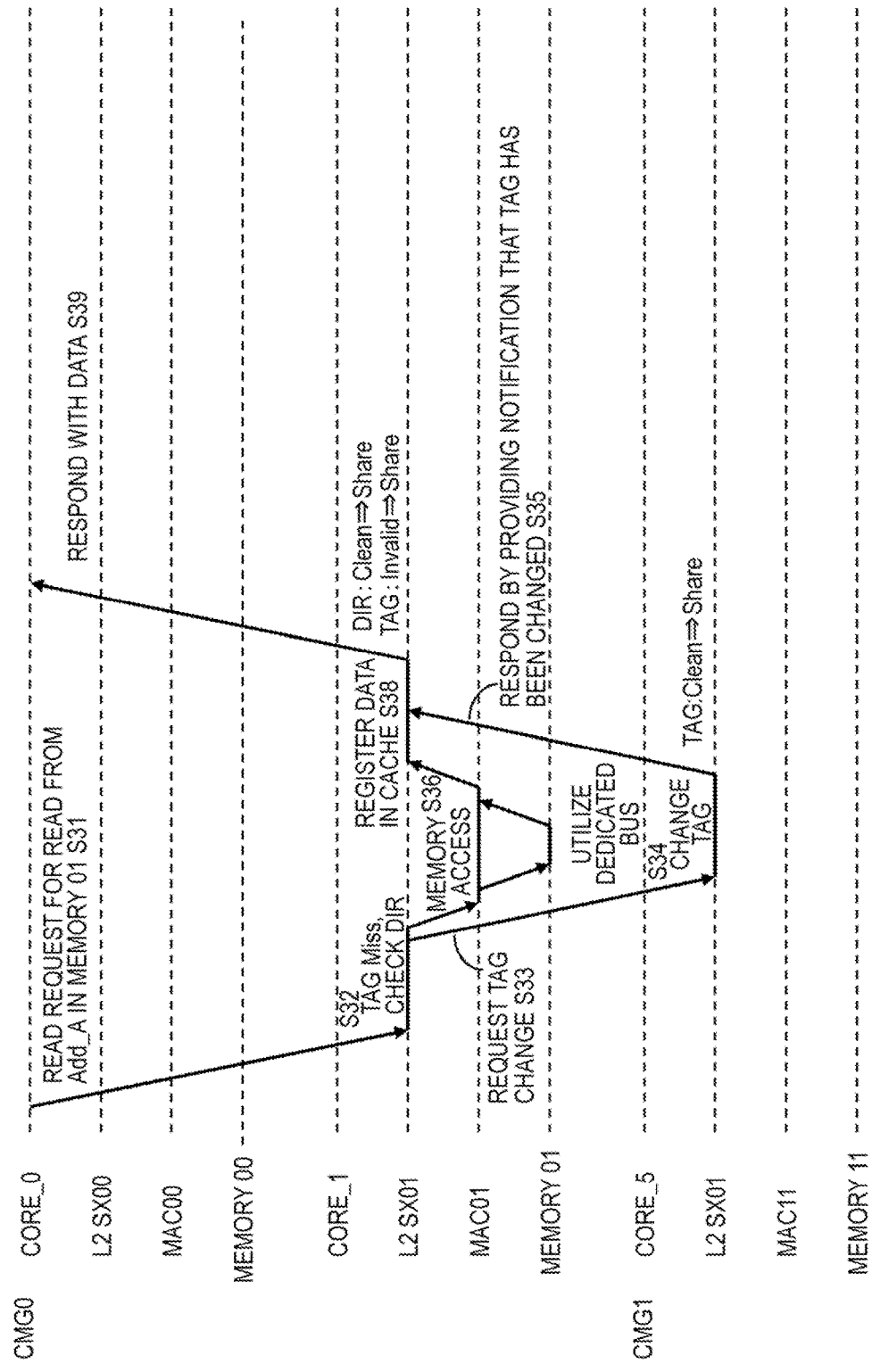
FIG. 9 is a sequence diagram depicting the operation for the access request III.

FIG. 9 is a sequence diagram depicting the operation for the access request III. The assumed status information is such that the L2 cache SX01 in the CMG0 is in the invalid status and the L2 cache SX01 in the CMG1 is in the clean status. This state is a state where an access request VII described below has ended, but the CMG0 and the CMG1 are in a reverse relation.

First, the core 100 (CORE_0) in the first core group CMG0 outputs a read request for read from the address A in the memory 01 to the request input port IN_P of the L2 cache SX01 via the intra-core-group bus B_0 (S31). In response to the read request, the L2 cache SX01 in the CMG0 performs a tag search, which results in cache miss, and then carries out a directory search to detect the clean status (S32).

Then, the L2 cache SX01 in the CMG0 accesses the memory 01 via the MAC_01 to acquire the data (S36), and registers the data in the cache (S38). The L2 cache SX01 in the CMG0 then changes the directory from the clean status to the share status (S38), and responds to the requesting core 100 (CORE_0) with the data (S39). At the same time, the L2 cache SX01 in the CMG0 outputs a tag change request to the L2 cache SX01 in the CMG1 via the inter-core-group bus B_01 so as to change the tag status information from "clean" to "share" (S33). In response, the L2 cache SX01 in the CMG1 changes the tag status information (S34), and responds to the L2 cache SX01 in the CMG0 by notifying the L2 cache SX01 that the tag has been changed (S35). The L2 cache SX01 in the CMG0 responds to the core 100 (CORE_0) with the data before receiving the tag change response (S39).

In the operation for the access request III, the L2 cache SX01 in the CMG0, in which cache miss has occurred, may acquire the data from the L2 cache SX01 in the CMG1 when the latencies are short. However, the access request for access to the memory 01 made by the L2 cache SX01 in the CMG0 may have shorter latencies due to a prefetch request being performed preliminary.

[Access Request IV]

The operation for an access request IV is an operation in which, in FIG. 6, when the data is registered in the L2 cache SX01 in the CMG0 (S1, YES) and registered in the L2 cache SX01 in the CMG1 in the dirty status (S2, YES and S3, NO), the L2 cache SX01 in the CMG0 transfers the data from the L2 cache SX01 in the CMG1 (S9).

Figure 10:
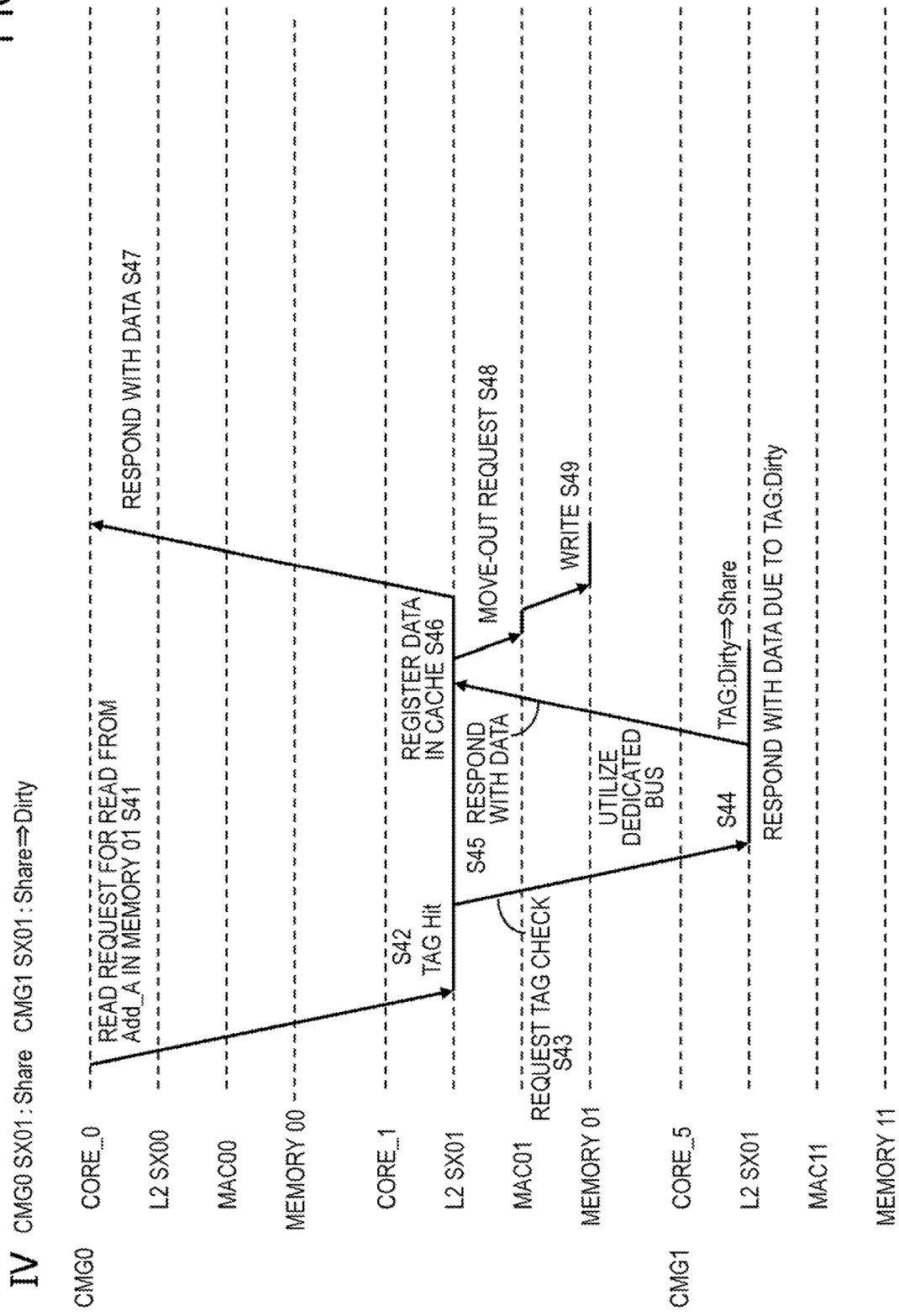
FIG. 10 is a sequence diagram depicting the operation for the access request IV.

FIG. 10 is a sequence diagram depicting the operation for the access request IV. The assumed status information is such that the L2 cache SX01 in the CMG0 is in the share status and the L2 cache SX01 in the CMG1 has been changed from the share status to the dirty status.

First, the core 100 (CORE_0) in the first core group CMG0 outputs a read request for read from the address A in the memory 01 to the request input port IN_P of the L2 cache SX01 via the intra-core-group bus B_0 (S41). In response to the read request, the L2 cache SX01 in the CMG0 performs a tag search, which results in a cache hit because the status information is "share" (S42). In the present embodiment, no directory check is performed when a cache hit occurs in the L2 cache.

Thus, since the status information is "share", the L2 cache SX01 in the CMG0 issues a tag check request to the L2 cache SX01 in the CMG1 via the inter-core-group bus B_01 (543). In response, since the L2 cache SX01 in the CMG1 performs a tag search and detects the dirty status, the L2 cache SX01 in the CMG1 reads the data in the cache memory and change the tag status information to share (S44). The L2 cache SX01 in the CMG1 then responds to the L2 cache SX01 in the CMG0 with the data via the inter-core-group bus B_01 (S45).

Then, the L2 cache SX01 in the CMG0 registers the data therein (S46), and responds to the core 100 (CORE_0) with the data (S47). Furthermore, the L2 cache SX01 in the CMG0 issues a move-out request to the MAC_01 (S48), and writes the data to the memory 01 (S49). This maintains data coherency between the cache and the memory.

In this operation, the L2 cache SX01 in the CMG0 does not perform maintenance work for changing the directory. This is because the operation 20o does not refer to the directory due to a cache hit thereafter. However, if the data registered in the L2 cache SX01 in the CMG0 is replaced with other data and moved out to the memory 01, cache miss subsequently occurs, and thus, maintenance work is executed on the directory.

[Access Request V]

The operation for an access request V is an operation in which, in FIG. 6, when the data is registered in the L2 cache SX01 in the CMG0 (S1, YES) and registered in the L2 cache SX01 in the CMG1 in the share status (S2, YES and S3, YES), the L2 cache SX01 in the CMG0 transfers the data registered therein (S5).

Figure 11:
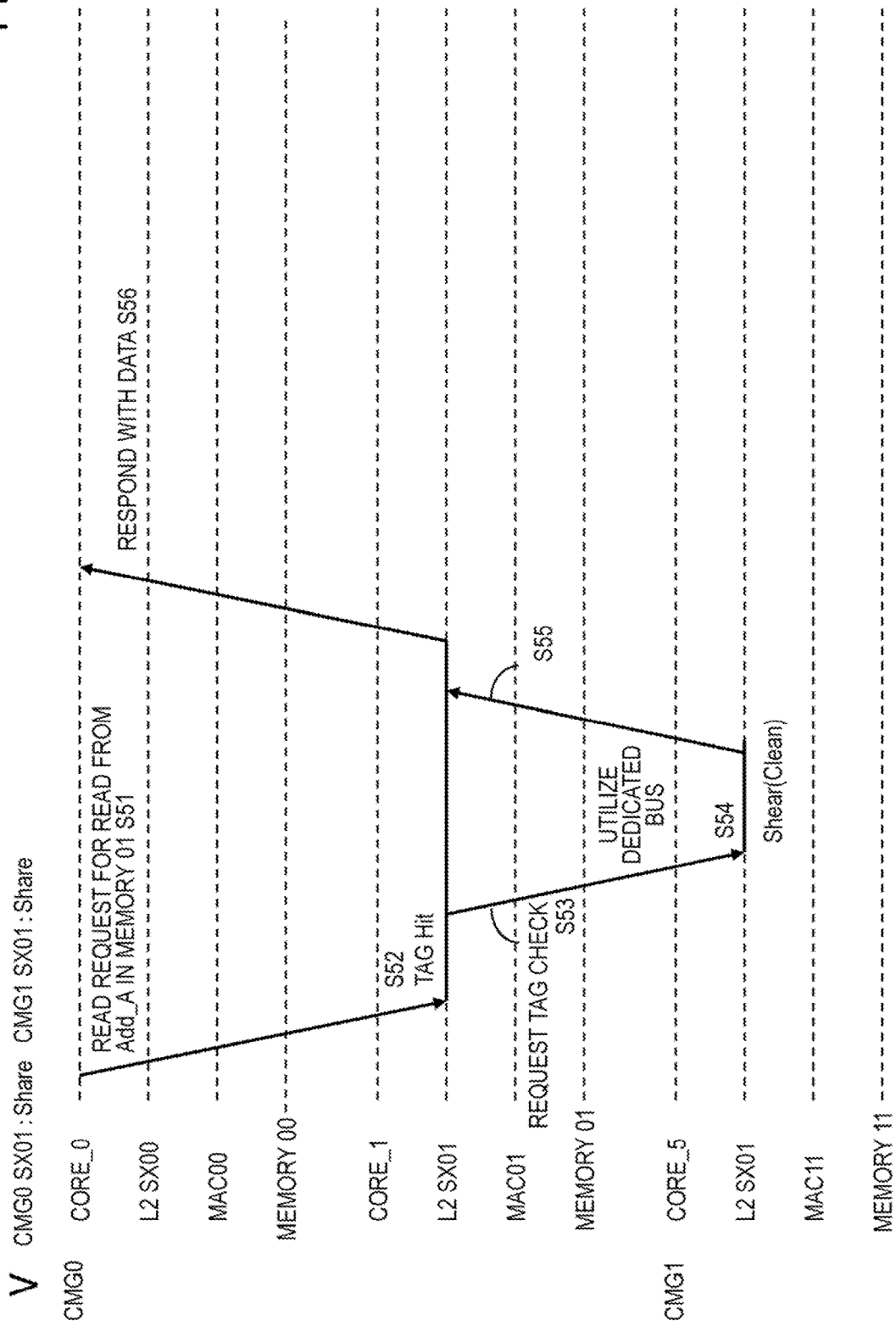
FIG. 11 is a sequence diagram depicting the operation for the access request V.

FIG. 11 is a sequence diagram depicting the operation for the access request V. The assumed status information is such that the L2 cache SX01 in the CMG0 is in the share status and the L2 cache SX01 in the CMG1 is also in the share status.

First, the core 100 (CORE_0) in the first core group CMG0 outputs a read request for read from the address A in the memory 01 to the request input port IN_P of the L2 cache SX01 via the intra-core-group bus B_0 (S51). In response to the read request, the L2 cache SX01 in the CMG0 performs a tag search, which results in a cache hit because the status information is "share" (S52). No directory check is performed as in the case with the access request IV.

Thus, since the status information is "share", the L2 cache SX01 in the CMG0 issues a tag check request to the L2 cache SX01 in the CMG1 via the inter-core-group bus B_01 (S53). In response, the L2 cache SX01 in the CMG1 performs a tag search to detect the share status (S54), and responds to the L2 cache SX01 in the CMG0 with a tag check result ("share") via the inter-core-group bus B_01 (S55). In response, the L2 cache SX01 in the CMG0 responds to the core 100 (CORE_0) with the data in the cache memory (S56).

In this example, the status information on the two caches is not changed.

[Access Request VI]

The operation for an access request VI is an operation in which, in FIG. 6, when the data is registered in the L2 cache SX01 in the CMG0 (S1, YES) and is not registered in the L2 cache SX01 in the CMG1 (S2, NO), the L2 cache SX01 in the CMG0 transfers the data registered therein (S5).

Figure 12:
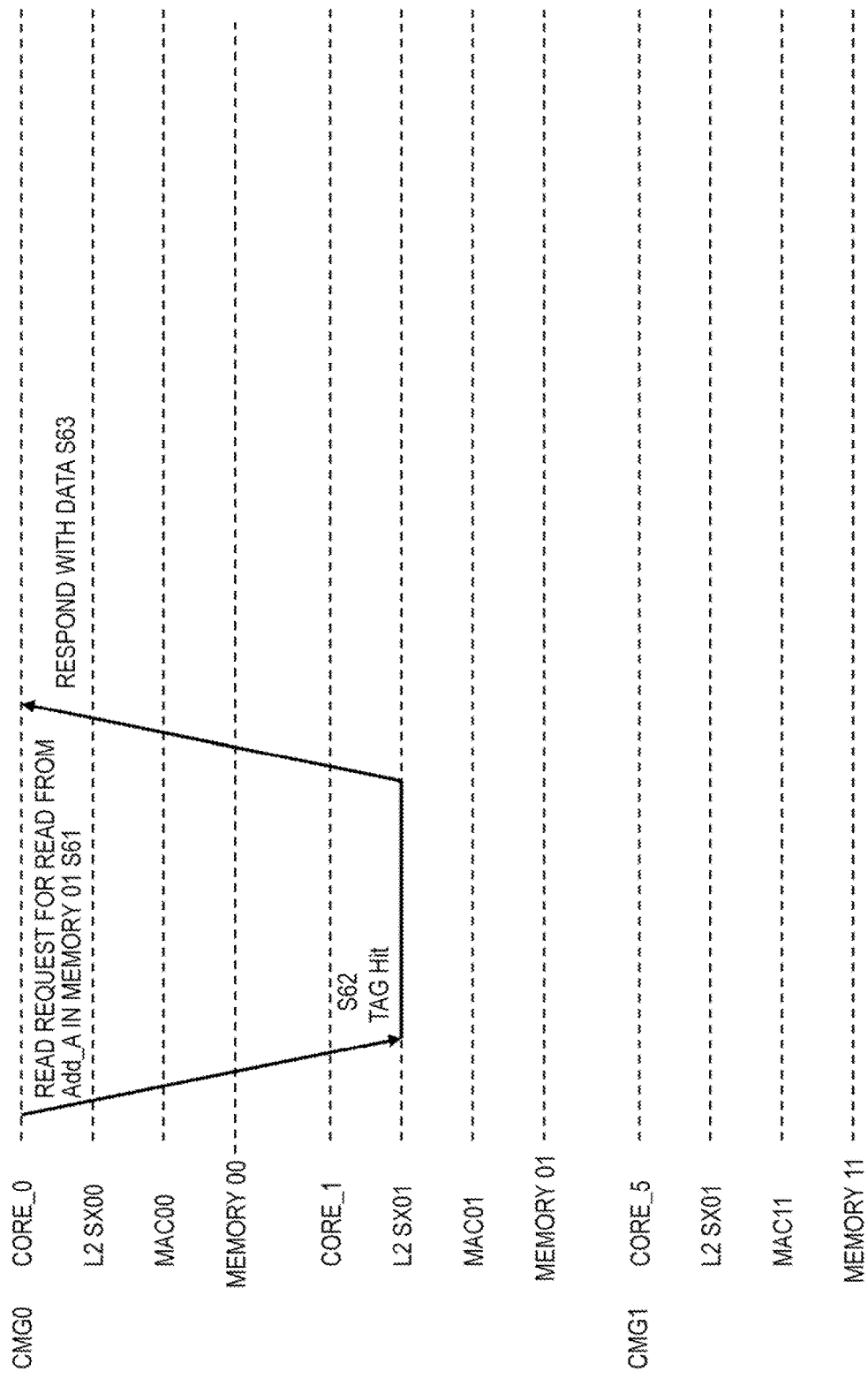
FIG. 12 is a sequence diagram depicting the operation for the access request VI.

FIG. 12 is a sequence diagram depicting the operation for the access request VI. The assumed status information is such that the L2 cache SX01 in the CMG0 is in the clean status or the dirty status and the L2 cache SX01 in the CMG1 is in the invalid status.

First, the core 100 (CORE_0) in the first core group CMG0 outputs a read request for read from the address A in the memory 01 to the request input port IN_P of the L2 cache SX01 via the intra-core-group bus B_0 (S61). In response to the read request, the L2 cache SX01 in the CMG0 performs a tag search, which results in a cache hit because the status information is "clean" or "dirty" (S62).

Since the status information is not "share", the L2 cache SX01 in the CMG0 responds to the core 100 (CORE_0) with the data in the cache memory (S63).

In this example, the status information on the two caches is not changed.

[Access Request VII]

In the operation for an access request VII, the core 100 (CORE_0) in the CMG0 makes a read request (load request) for read from the address B in the memory 11 in the CMG1. The access request VII involves an access target different from the access target of the read request for read from the address A in the memory 01 in the above-described access requests I to VI.

FIG. 13 is a sequence diagram depicting the operation for the access request VII. The assumed status information is such that both the L2 cache SX01 in the CMG0 and the L2 cache SX01 in the CMG1 are in the invalid status.

First, the core 100 (CORE_0) in the first core group CMG0 outputs a read request for read from the address B in the memory 11 to the request input port IN_P of the L2 cache SX01 via the intra-core-group bus B_0 (S71). In response to the read request, the L2 cache SX01 in the CMG0 performs a tag search, which results in a cache miss because the status information is "invalid" (S72). The L2 cache SX01 in the CMG0 then utilizes the inter-core-group bus B_01 to issue a read request to the L2 cache SX01 in the CMG1 (S73). In this case, the data in the memory 11 is requested. Therefore, the directory in the L2 cache SX01 in the CMG0 does not include the status of the data in the memory 11.

The L2 cache SX01 in the CMG1 performs a tag search, which results in a cache miss (S74), and then issues a memory access request to the memory access controller MAC_11 to read the data from the memory 11 (S75). Since the data in the memory 11 is not registered in the cache memory but is taken out by the L2 cache SX01 in the CMG0, the L2 cache SX01 in the CMG1 changes the directory from the invalid status to the clean status (S76) but does not change the tag status, and responds with the data via the inter-core-group bus B_01 (S77).

On the other hand, upon receiving the data response, the L2 cache SX01 in the CMG0 registers the data therein, changes the tag from the invalid status to the clean status (S78), and responds to the core 100 (CORE_0) with the data (S79).

The state in which the access request VII has ended is the same as the initial state of the access request III except that the relation between the CMG0 and the CMG1 is reversed.

[Embodiment in which No Directory is Held]

In an embodiment in which each of the L2 caches does not hold directory that holds information indicating whether or not the data in the memory of that L2 cache has been taken out by the other L2 cache, the following operation is performed.

That is, in the above-described access requests I, II, and III, when a cache miss occurs in the L2 cache SX01 in the CMG0, no directory is checked. Instead, the L2 cache SX01 in CMG0 requests via the inter-core-group bus to the L2 cache SX01 in CMG1 to check the tag status information, and acquires the status information via the inter-core-group bus for the opposite direction. Then, when the status information is "dirty", the L2 cache SX01 in CMG0 acquires the data from the L2 cache SX01 in the CMG1.

As described above, according to the present embodiment, between the first and second core groups CMG0 and CMG1 having a plurality of cores and N (N denotes a plurality) L2 caches, the N inter-core-group buses B_00 to B_11 are each provided between the corresponding one of the pairs of the N L2 caches. This allows all the cores to access all the memory spaces using a small number of buses between the core groups and enables a reduction in the latency in the memory access between the different core groups. As described above, the buses between the core groups are utilized to transfer data and tag information between each pair of connected L2 caches.

The present embodiment is applicable not only to two core groups but also to more than two core groups, for example, a plurality of core groups such as 4, 8, or 16 core groups.

All examples and conditional language provided herein are intended for the pedagogical purposes of aiding the reader in understanding the Invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus comprising:
    a first core group and a second core group each including a plurality of arithmetic processing sections, a first to an Nth caches that process access requests from the plurality of arithmetic processing sections, and an intra-core-group bus through which the access requests from the plurality of arithmetic processing sections are provided to the first to Nth caches; and
    a first to an Nth inter-core-group buses each provided between a corresponding one of the first to Nth caches in the first core group and a corresponding one of the first to Nth caches in the second core group,
    wherein the N is a plural number,
    the first to Nth caches in the first core group individually access and store data in a first to an Nth memory spaces in a memory, respectively,
    the first to Nth caches in the second core group individually access and store data in an N+1th to a 2Nth memory spaces in the memory, respectively,
    the first to Nth caches in the first core group request the data in the N+1th to 2Nth memory spaces in the memory to the first to Nth caches in the second core group, respectively, via the first to Nth inter-core-group buses and store the requested data, and
    the first to Nth caches in the second core group request the data in the first to Nth memory spaces in the memory to the first to Nth caches in the first core group, respectively, via the first to Nth inter-core-group buses and store the requested data.

2. The arithmetic processing apparatus according to claim 1, wherein, when each of the first to Nth caches in the first core group does not store latest data for the data in a corresponding one of the first to Nth memory spaces in the memory, each of the first to Nth caches in the first core group acquires the latest data from a corresponding one of the first to Nth caches in the second core group via a corresponding one of the first to Nth inter-core-group buses and stores the latest data, and
    when each of the first to Nth caches in the second core group does not store latest data for the data in a corresponding one of the N+1th to 2Nth memory spaces in the memory, each of the first to Nth caches in the second core group acquires the latest data from a corresponding one of the first to Nth caches in the first core group via a corresponding one of the first to Nth inter-core-group buses and stores the latest data.

3. The arithmetic processing apparatus according to claim 1, wherein each of the first to Nth caches includes a cache tag and a cache memory,
    each of the first to Nth caches in the first core group changes status information on data in the cache tag in the corresponding one of the first to Nth caches in the second core group via the corresponding one of the first to Nth inter-core-group buses, and
    each of the first to Nth caches in the second core group changes status information on data in the cache tag in the corresponding one of the first to Nth caches in the first core group via the corresponding one of the first to Nth inter-core-group buses.

4. The arithmetic processing apparatus according to claim 2, wherein each of the first to Nth caches includes a cache tag and a cache memory,
    each of the first to Nth caches in the first core group changes status information on data in the cache tag in the corresponding one of the first to Nth caches in the second core group via the corresponding one of the first to Nth inter-core-group buses, and
    each of the first to Nth caches in the second core group changes status information on data in the cache tag in the corresponding one of the first to Nth caches in the first core group via the corresponding one of the first to Nth inter-core-group buses.

5. The arithmetic processing apparatus according to claim 1, wherein each of the first to Nth caches includes a cache tag and a cache memory,
    each of the first to Nth caches in the first core group inquires about status information on data in the cache tag in the corresponding one of the first to Nth caches in the second core group via the corresponding one of the first to Nth inter-core-group buses, and acquires the status information, and
    each of the first to Nth caches in the second core group inquires about status information on data in the cache tag in the corresponding one of the first to Nth caches in the first core group via the corresponding one of the first to Nth inter-core-group buses, and acquires the status information.

6. The arithmetic processing apparatus according to claim 2, wherein each of the first to Nth caches includes a cache tag and a cache memory,
    each of the first to Nth caches in the first core group inquires about status information on data in the cache tag in the corresponding one of the first to Nth caches in the second core group via the corresponding one of the first to Nth inter-core-group buses, and acquires the status information, and
    each of the first to Nth caches in the second core group inquires about status information on data in the cache tag in the corresponding one of the first to Nth caches in the first core group via the corresponding one of the first to Nth inter-core-group buses, and acquires the status information.

7. The arithmetic processing apparatus according to claim 4, wherein the status information includes at least a first status in which data is not stored in the cache memory, a second status in which data identical to the data in the memory is stored, and a third status in which latest data different from the data in the memory is stored.

8. The arithmetic processing apparatus according to claim 6, wherein the status information includes at least a first status in which data is not stored in the cache memory, a second status in which data identical to the data in the memory is stored, and a third status in which latest data different from the data in the memory is stored.

9. The arithmetic processing apparatus according to claim 1, wherein each of the first to Nth caches in the first core group includes a directory that holds directory information indicating whether or not the corresponding one of the first to Nth caches in the second core group stores the data from the corresponding one of the first to Nth memory spaces in the memory, and when the directory information in the directory indicates that latest data is stored, each of the first to Nth caches in the first core group acquires the latest data from the corresponding one of the first to Nth caches in the second core group via the inter-core-group bus.

10. The arithmetic processing apparatus according to claim 2, wherein each of the first to Nth caches in the first core group includes a directory that holds directory information indicating whether or not the corresponding one of the first to Nth caches in the second core group stores the data from the corresponding one of the first to Nth memory spaces in the memory, and when the directory information in the directory indicates that latest data is stored, each of the first to Nth caches in the first core group acquires the latest data from the corresponding one of the first to Nth caches in the second core group via the inter-core-group bus.

11. The arithmetic processing apparatus according to claim 9, wherein, when the directory information in the directory indicates that data identical to the data in the memory is stored, each of the first to Nth caches in the first core group acquires the data from the memory.

12. The arithmetic processing apparatus according to claim 1, wherein the first and second core groups each include a first to an Nth arithmetic processing sections,
each of the first to Nth arithmetic processing sections in the first core group registers data read from the corresponding one of the first to Nth memory spaces in the memory, in the corresponding one of the first to Nth caches in the first core group, and
each of the first to Nth arithmetic processing sections in the second core group registers data read from the corresponding one of the N+1th to 2Nth memory spaces in the memory, in the corresponding one of the first to Nth caches in the second core group.

13. A method of controlling an arithmetic processing apparatus that includes:
a first core group and a second core group each including a plurality of arithmetic processing sections, a first to an Nth caches that process access requests from the plurality of arithmetic processing sections, and an intra-core-group bus through which the access requests from the plurality of arithmetic processing sections are provided to the first to Nth caches; and
a first to an Nth inter-core-group buses each provided between a corresponding one of the first to Nth caches in the first core group and a corresponding one of the first to Nth caches in the second core group,
the N being a plural number,
the method comprising:
individually accessing and storing, by the first to Nth caches in the first core group, data in a first to an Nth memory spaces in a memory, respectively,
individually accessing and storing, by the first to Nth caches in the second core group, data in an N+1th to a 2Nth memory spaces in the memory, respectively,
requesting, by the first to Nth caches in the first core group, the data in the N+1th to 2Nth memory spaces in the memory to the first to Nth caches in the second core group, respectively, via the first to Nth inter-core-group buses, and storing the requested data and
requesting, by the first to Nth caches in the second core group, the data in the first to Nth memory spaces in the memory to the first to Nth caches in the first core group, respectively, via the first to Nth inter-core-group buses, and storing the requested data.

14. The method of controlling an arithmetic processing apparatus according to claim 13, wherein,
when each of the first to Nth caches in the first core group does not store latest data for the data in a corresponding one of the first to Nth memory spaces in the memory, each of the first to Nth caches in the first core group acquires the latest data from a corresponding one of the first to Nth caches in the second core group via a corresponding one of the first to Nth inter-core-group buses and stores the latest data, and
when each of the first to Nth caches in the second core group does not store latest data for the data in a corresponding one of the N+1th to 2Nth memory spaces in the memory, each of the first to Nth caches in the second core group acquires the latest data from a corresponding one of the first to Nth caches in the first core group via a corresponding one of the first to Nth inter-core-group buses and stores the latest data.

\* \* \* \* \*